(12) United States Patent
Challa et al.

(10) Patent No.: US 7,801,248 B2
(45) Date of Patent: Sep. 21, 2010

(54) INTERFERENCE SUPPRESSION WITH VIRTUAL ANTENNAS

(75) Inventors: Raghu Challa, San Diego, CA (US); Roland Reinhard Rick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 822 days.

(21) Appl. No.: 11/122,654

(22) Filed: May 4, 2005

(65) Prior Publication Data

US 2006/0109938 A1    May 25, 2006

Related U.S. Application Data

(60) Provisional application No. 60/629,656, filed on Nov. 19, 2004.

(51) Int. Cl.
*H04L 27/06* (2006.01)
*H03D 1/04* (2006.01)

(52) U.S. Cl. .................. 375/316; 375/229; 375/346

(58) Field of Classification Search ......... 375/229–232, 375/316, 295, 346
See application file for complete search history.

(56) References Cited

U.S. PATENT DOCUMENTS

| | | | | |
|---|---|---|---|---|
| 5,386,239 | A * | 1/1995 | Wang et al. | .............. 348/472 |
| 5,453,797 | A | 9/1995 | Nicolas et al. | |
| 6,177,951 | B1 | 1/2001 | Ghosh | |
| 6,298,092 | B1 * | 10/2001 | Heath et al. | .............. 375/267 |
| 6,314,147 | B1 * | 11/2001 | Liang et al. | .............. 375/346 |
| 6,480,233 | B1 * | 11/2002 | Limberg | .............. 348/470 |
| 6,650,716 | B1 * | 11/2003 | Ratnarajah | .............. 375/347 |
| 6,738,949 | B2 * | 5/2004 | Senda et al. | .............. 714/796 |
| 6,831,953 | B2 * | 12/2004 | Porcino | .............. 375/261 |
| 6,999,538 | B2 * | 2/2006 | Kung et al. | .............. 375/347 |
| 7,027,536 | B1 * | 4/2006 | Al-Dhahir | .............. 375/347 |
| 7,031,411 | B2 * | 4/2006 | Arslan et al. | .............. 375/346 |
| 7,092,036 | B2 * | 8/2006 | DSouza | .............. 348/614 |
| 7,099,386 | B2 * | 8/2006 | Krupka | .............. 375/232 |
| 7,107,031 | B2 * | 9/2006 | Kristensson et al. | .............. 455/296 |

(Continued)

OTHER PUBLICATIONS

Wong, H.E. et al. "Two-Stage Interference Immune Blind Equaliser Which Exploits Cyclostationary Statistics", IEEE vol. 32, No. 19. Sep. 12, 1996. XP006005686. pp. 1763-1764.

(Continued)

*Primary Examiner*—Temesghen Ghebretinsae
(74) *Attorney, Agent, or Firm*—Kenneth Vu

(57) ABSTRACT

A receiver suppresses co-channel interference (CCI) from other transmitters and intersymbol interference (ISI) due to channel distortion using "virtual" antennas. The virtual antennas may be formed by (1) oversampling a received signal for each actual antenna at the receiver and/or (1) decomposing a sequence of complex-valued samples into a sequence of inphase samples and a sequence of quadrature samples. In one design, the receiver includes a pre-processor, an interference suppressor, and an equalizer. The pre-processor processes received samples for at least one actual antenna and generates at least two sequences of input samples for each actual antenna. The interference suppressor suppresses co-channel interference in the input sample sequences and provides at least one sequence of CCI-suppressed samples. The equalizer performs detection on the CCI-suppressed sample sequence(s) and provides detected bits. The interference suppressor and equalizer may be operated for one or multiple iterations.

46 Claims, 11 Drawing Sheets

U.S. PATENT DOCUMENTS

| | | | |
|---|---|---|---|
| 7,149,258 B2 * | 12/2006 | Nilsson et al. | 375/316 |
| 7,194,237 B2 * | 3/2007 | Sugar et al. | 455/39 |
| 7,203,257 B2 * | 4/2007 | Fimoff et al. | 375/343 |
| 7,302,231 B2 * | 11/2007 | Sun | 455/63.1 |
| 2001/0033583 A1 * | 10/2001 | Rabenko et al. | 370/503 |
| 2002/0172276 A1 * | 11/2002 | Tan et al. | 375/233 |
| 2003/0001974 A1 * | 1/2003 | DSouza | 348/614 |
| 2003/0048861 A1 * | 3/2003 | Kung et al. | 375/347 |
| 2003/0063596 A1 * | 4/2003 | Arslan et al. | 370/347 |
| 2003/0206577 A1 * | 11/2003 | Liberti et al. | 375/152 |
| 2004/0014424 A1 * | 1/2004 | Kristensson et al. | 455/63.1 |
| 2004/0022335 A1 * | 2/2004 | Arslan et al. | 375/346 |
| 2004/0192215 A1 * | 9/2004 | Onggosanusi et al. | 455/67.13 |
| 2004/0234012 A1 * | 11/2004 | Rooyen | 375/347 |
| 2004/0266383 A1 * | 12/2004 | Mattellini et al. | 455/307 |
| 2005/0036575 A1 * | 2/2005 | Kuchi et al. | 375/348 |
| 2005/0105646 A1 * | 5/2005 | Arslan et al. | 375/316 |
| 2005/0107057 A1 * | 5/2005 | Sun | 455/272 |
| 2005/0201493 A1 * | 9/2005 | Onggosanusi et al. | 375/340 |
| 2005/0254600 A1 * | 11/2005 | Chen et al. | 375/324 |
| 2006/0109938 A1 * | 5/2006 | Challa et al. | 375/347 |
| 2007/0127608 A1 * | 6/2007 | Scheim et al. | 375/346 |

OTHER PUBLICATIONS

Warner, E. S. et al. "Single-Channel Blind Signal Separation of Filtered MPSK Signals". IEE vol. 150, No. 6. Dec. 1, 2003. XP006024347. pp. 396-402.

Liang, et al., "Two Stage CCI/ISI Reduction with Space-Time Processing in TDMA Cellular Networks" 1058-6393/97 pp. 607-611 (IEEE).

Gozzo, F., "Recursive least-squares sequence estimation" IBM J. Res. Develop. vol. 38:2 (Mar. 1994), pp. 131-156.

Pukkila, et al., "Channel Estimation Modeling" S-72.333 Nokia Research Center (Fall 2000).

Hoeher, et al., "Single Antenna Co-Channel Interference Cancellation for TDMA Cellular Radio Systems" IEEE Wireless Communications (Apr. 2005).

* cited by examiner

INTERFERENCE SUPPRESSION WITH VIRTUAL ANTENNAS

This application claims the benefit of provisional U.S. Application Ser. No. 60/629,656, entitled "MIMO based SAIC Algorithms for GSM/GPRS," filed Nov. 19, 2004, assigned to the assignee of the present application, and incorporated herein by reference in its entirety for all purposes.

BACKGROUND

I. Field

The present invention relates generally to communication, and more specifically to a receiver in a communication system.

II. Background

In a communication system, a transmitter processes data to generate a modulated signal and transmits the modulated signal on a frequency band/channel and via a communication channel to a receiver. The transmitted signal is distorted by the communication channel, corrupted by noise, and further degraded by co-channel interference, which is interference from other transmitters transmitting on the same frequency band/channel. The receiver receives the transmitted signal, processes the received signal, and attempts to recover the data sent by the transmitter. The distortion due to the communication channel, the noise, and the co-channel interference all hinder the receiver's ability to recover the transmitted data.

There is therefore a need in the art for a receiver that can effectively deal with co-channel interference and channel distortion.

SUMMARY

A receiver capable of suppressing co-channel interference (CCI) from other transmitters and intersymbol interference (ISI) due to channel distortion using "virtual" antennas is described herein. The virtual antennas may be formed by (1) oversampling a received signal for each actual antenna at the receiver and/or (1) decomposing a sequence of complex-valued samples for each actual antenna into a sequence of inphase samples and a sequence of quadrature samples, where the inphase and quadrature samples are for the real and imaginary parts, respectively, of the complex-valued samples. If the receiver is equipped with $N_{ant}$ actual antennas, where $N_{ant} \geq 1$ then $2N_{ant}$ virtual antennas may be obtained via real/imaginary decomposition, $N_{ant} \cdot N_{os}$ virtual antennas may be obtained via $N_{os}$ times oversampling, and $2 \cdot N_{ant} \cdot N_{os}$ virtual antennas may be obtained via real/imaginary decomposition and $N_{os}$ times oversampling.

In an embodiment, the receiver includes a pre-processor, an interference suppressor, and an equalizer. The pre-processor processes the received samples for at least one actual antenna and generates at least two sequences of input samples for each actual antenna. Each input sample sequence corresponds to one virtual antenna. The pre-processor performs processing pertinent for the modulation scheme used for transmission, e.g., phase rotation for Gaussian minimum shift keying (GMSK) used in a Global System for Mobile Communications (GSM) system. The interference suppressor suppresses co-channel interference in the input sample sequences and provides at least one sequence of CCI-suppressed samples. The equalizer performs detection on the CCI-suppressed sample sequence(s) and provides detected bits.

In an embodiment, the interference suppressor includes a channel estimator, a signal estimator, a computation unit, and a multiple-input multiple-output (MIMO) filter. The channel estimator derives at least one channel estimate based on the input sample sequences. The signal estimator derives at least one desired signal estimate based on the at least one channel estimate. The computation unit computes weights used for co-channel interference suppression. The MIMO filter filters the input sample sequences with the weights and provides the CCI-suppressed sample sequence(s).

In an embodiment, the equalizer includes a channel estimator and a detector. The channel estimator derives at least one improved channel estimate based on the at least one CCI-suppressed sample sequence from the interference suppressor. The detector performs detection on the CCI-suppressed sample sequence(s) with the improved channel estimate(s) and provides the detected bits.

Other embodiments of the interference suppressor and equalizer are described below. Various other aspects and embodiments of the invention are also described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The receiver with virtual antennas may be used in various communication systems. For clarity, the receiver is specifically described below for GSM.

Figure 1:
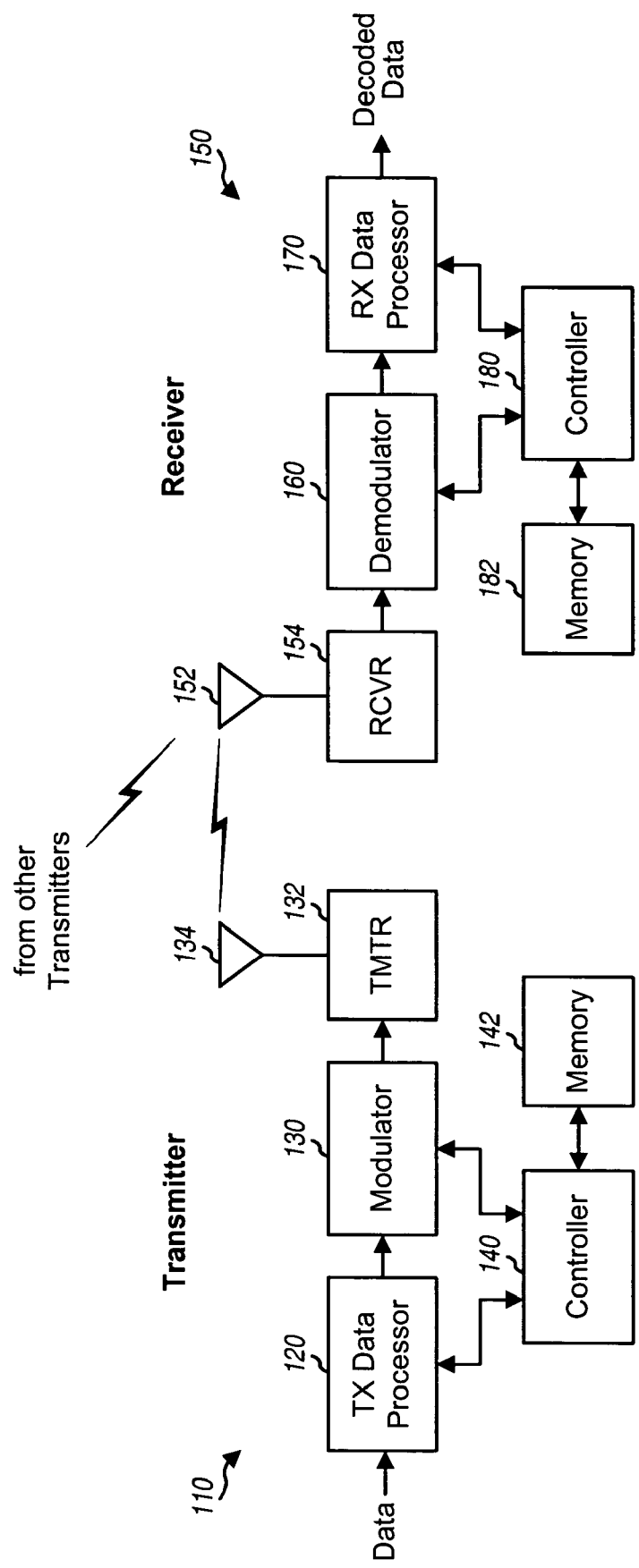
FIG. 1 shows a transmitter and a receiver in a wireless communication system.

FIG. 1 shows a block diagram of a transmitter 110 and a receiver 150 in a wireless communication system. Transmitter 110 may be a base station or a wireless device, and receiver 150 may also be a wireless device or a base station. At transmitter 110, a transmit (TX) data processor 120 receives, formats, encodes, and interleaves data based on a coding and interleaving scheme and provides a stream of input bits to a modulator 130. For GSM, modulator 130 performs GMSK modulation on the input bits and provides a GMSK modulated signal (or simply, a GMSK signal). GMSK is a continuous phase modulation scheme used in GSM and is described below. A transmitter unit (TMTR) 132 conditions (e.g., filters and amplifies) the GMSK signal and generates a radio frequency (RF) modulated signal, which is transmitted via an antenna 134 to receiver 150.

At receiver 150, an antenna 152 receives the RF modulated signal from transmitter 110 and RF modulated signals from other transmitters in the GSM system. Antenna 152 provides a received GMSK signal to a receiver unit (RCVR) 154. Receiver unit 154 conditions and digitizes the received GMSK signal and provides received samples. A demodulator 160 processes the received samples and provides detected bits, as described below. An RX data processor 170 processes (e.g., deinterleaves and decodes) the detected bits and recovers the data sent by transmitter 110. The processing by demodulator 160 and RX data processor 170 is complementary to the processing by modulator 130 and TX data processor 120, respectively, at transmitter 110.

Controllers 140 and 180 direct operation at transmitter 110 and receiver 150, respectively. Memory units 142 and 182 provide storage for program codes and data used by controllers 140 and 180, respectively.

Figure 2:
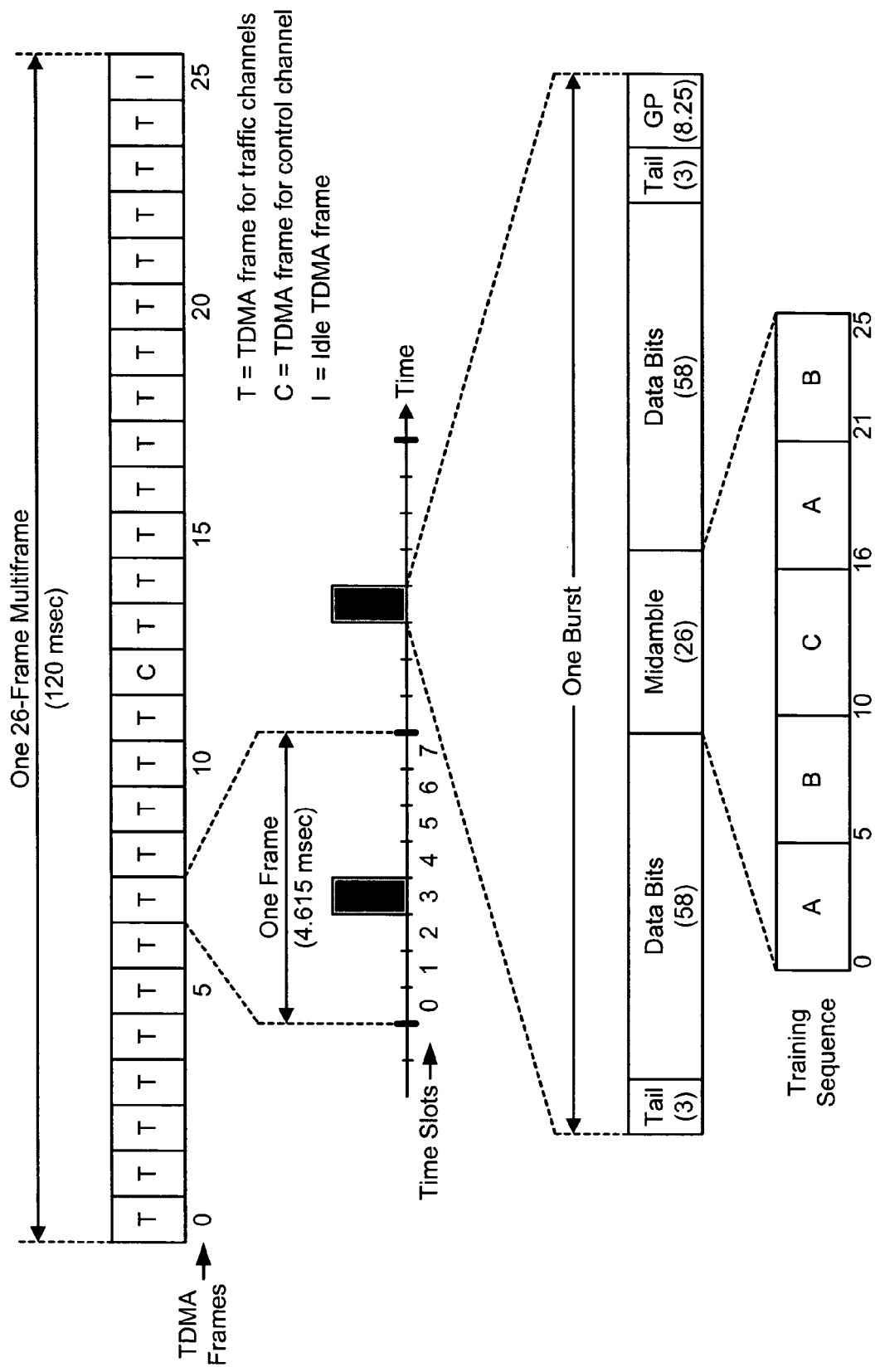
FIG. 2 shows exemplary frame and burst formats in GSM.

FIG. 2 shows exemplary frame and burst formats in GSM. The timeline for downlink transmission is divided into multiframes. For traffic channels used to send user-specific data, each multiframe includes 26 TDMA frames, which are labeled as TDMA frames 0 through 25. The traffic channels are sent in TDMA frames 0 through 11 and TDMA frames 13 through 24 of each multiframe. A control channel is sent in TDMA frame 12. No data is sent in the idle TDMA frame 25, which is used by the wireless devices to make measurements for neighbor base stations.

Each TDMA frame is further partitioned into eight time slots, which are labeled as time slots 0 through 7. Each active wireless device/user is assigned one time slot index for the duration of a call. User-specific data for each wireless device is sent in the time slot assigned to that wireless device and in TDMA frames used for the traffic channels.

The transmission in each time slot is called a "burst" in GSM. Each burst includes two tail fields, two data fields, a training sequence (or midamble) field, and a guard period (GP). The number of bits in each field is shown inside the parentheses. GSM defines eight different training sequences that may be sent in the training sequence field. Each training sequence contains 26 bits and is defined such that the first five bits (labeled as 'A') are repeated and the second five bits (labeled as 'B') are also repeated, as shown in FIG. 2. Each training sequence is also defined such that the correlation of that sequence with a 16-bit truncated version of that sequence (with parts 'B', 'C', and 'A') is equal to (a) sixteen for a time shift of zero, (b) zero for time shifts of ±1, ±2, ±3, ±4, and ±5, and (3) a zero or non-zero value for all other time shifts.

To generate a GMSK signal, modulator 130 receives input bits a from TX data processor 120 and performs differential encoding on the input bits to generate code symbols c. One new code symbol is generated for each new input bit. Each input bit and each code symbol have a real value of either +1 or −1. Modulator 130 further filters each code symbol with a Gaussian lowpass filter to generate a frequency pulse having a duration of approximately four sample periods (4 T). Modulator 130 integrates the frequency pulses for the code symbols to generate a modulating signal and further modulates a carrier signal with the modulating signal to generate the GMSK signal.

The GMSK signal has a complex representation but may be approximated as follows:

$$s = \sum_{i=0} d_i \otimes p_i = d_0 \otimes p_0 + d_1 \otimes p_1 + \ldots, \qquad \text{Eq (1)}$$

where
 $\otimes$ denotes a convolution operation;
 $p_i$ denotes the i-th pulse shaping function; and
 $d_i$ denotes the input symbols for pulse shaping function $p_i$.

Equation (1) indicates that the complex GMSK signal may be expressed as a sum of amplitude-modulated signals. Each amplitude-modulated signal is generated by convolving a pulse shaping function $p_i$ with its input symbols $d_i$. For GMSK, there are eight pulse shaping functions $p_0$ through $p_7$, with $p_0$ being the dominant pulse shaping function that is much larger than the other seven pulse shaping functions. The input symbols $d_i$ for each pulse shaping function $p_i$ are derived from the input bits a based on a specific transformation associated with function $p_i$. For example, the input symbols $d_0$ for the dominant pulse shaping function $p_0$ may be expressed as:

$$d_0(t) = j^t \cdot a(t), \qquad \text{Eq (2)}$$

where a(t) is the input bit for sample period t, $j = \sqrt{-1}$, and $d_0(t)$ is the input symbol for the dominant pulse shaping function for sample period t. Equation (2) indicates that the input symbols $d_0$ for the dominant pulse shaping function are generated by rotating the input bits a by successively larger phases, or 0° for a(t), then 90° for a(t+1), then 180° for a(t+2), then 270° for a(t+3), then 0° for a(t+4), and so on.

Figure 3:
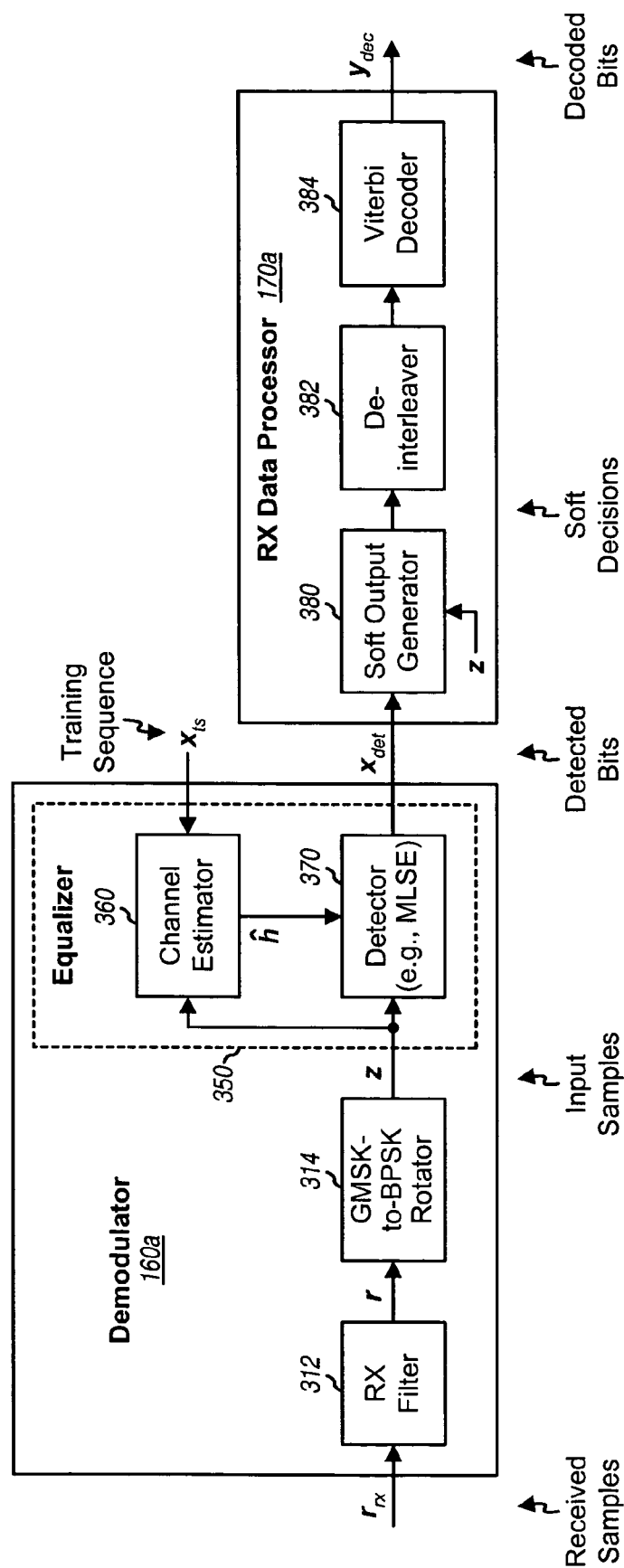
FIG. 3 shows a conventional demodulator and receive (RX) data processor for GSM.

FIG. 3 shows a demodulator 160a and an RX data processor 170a, which are conventional designs for demodulator 160 and RX data processor 170, respectively, at receiver 150 in FIG. 1. Within demodulator 160a, an RX filter 312 filters the received samples $r_{rx}$ from receiver unit 154 and provides intermediate samples r. The intermediate samples may be expressed as:

$$r = s \otimes h_c + v_r + n_r = \sum_{i=0} d_i \otimes p_i \otimes h_c + v_r + n_r, \qquad \text{Eq (3)}$$

where
 $h_c$ is the impulse response of the wireless channel from transmitter 110 to receiver 150;
 $p_i \otimes h_c$ is the i-th effective pulse shaping function;
 $v_r$ is the co-channel interference from other transmitters; and
 $n_r$ is the noise at the receiver.

A GMSK-to-BPSK rotator 314 performs phase rotation on the intermediate samples r and provides input samples z. The phase rotation may be expressed as:

$$z(t) = j^{-t} \cdot r(t), \qquad \text{Eq (4)}$$

where r(t) is the intermediate sample for sample period t; and z(t) is the input sample for sample period t.

Rotator 314 rotates the intermediate samples by successively more negative phases, or 0° for r(t), then −90° for r(t+1), then −180° for r(t+2), then −270° for r(t+3), then 0° for r(t+4), and so on. The phase rotation results in the input symbols $\tilde{d}_0(t)$ for the effective dominant pulse shaping function $p_0 \otimes h_c$ being equal to the input bits provided to modulator 130, or $\tilde{d}_0(t) = j^{-t} \cdot d_0(t) = a(t)$.

To simplify the receiver design, the GMSK signal may be approximated as a BPSK modulated signal that is generated with just the dominant pulse shaping function. The input samples may then be expressed as:

$$z = a \otimes p_0 \otimes h_c + v + n = a \otimes h + v + n, \qquad \text{Eq (5)}$$

where $h = p_0 \otimes h_c$ is the effective channel impulse response;

v is a rotated version of the co-channel interference $v_r$; and n is the total noise, which includes a rotated version of the noise $n_r$ and components of the other pulse shaping functions.

The GMSK-to-BPSK approximation in equation (5) is a reasonably good approximation since the dominant pulse shaping function $p_0$ is much larger than the other pulse shaping functions.

An equalizer 350 performs equalization on the input samples z to remove intersymbol interference caused by multipath in the wireless channel. For the design shown in FIG. 3, equalizer 350 includes a channel estimator 360 and a detector 370. Channel estimator 360 receives the input samples z and the training sequence $x_{ts}$ and derives an estimate of the effective channel impulse response h. The effective channel impulse response estimate $\hat{h}$ is approximately equal to the dominant pulse shaping function convolved with the actual channel impulse response, or $\hat{h} \approx p_0 \otimes h_c = h$.

Detector 370 receives the input samples z and the channel estimate $\hat{h}$ and performs detection to recover the input bits a. Detector 370 may implement a maximum likelihood sequence estimator (MLSE) that determines a sequence of bits that is most likely to have been transmitted given the input sample sequence z and the channel estimate $\hat{h}$. The MSLE uses a Viterbi algorithm with $2^{L-1}$ states, where L is the length of the channel estimate $\hat{h}$. Detection with MLSE for GSM is well known in the art and not described herein. Detector 370 provides detected bits $x_{det}$, which are hard decision estimates of the input bits a sent by transmitter 110.

Within RX data processor 170a, a soft output generator 380 receives the detected bits $x_{det}$ and the input samples z and generates soft decisions that indicate the confidence in the detected bits. Soft output generator 380 may implement an Ono algorithm that is well known in the art. A de-interleaver 382 de-interleaves the soft decisions in a manner complementary to the interleaving performed by transmitter 110. A Viterbi decoder 384 decodes the deinterleaved soft decisions and provides decoded data $y_{dec}$, which is an estimate of the traffic data provided to TX data processor 120 at transmitter 110.

Figure 4:
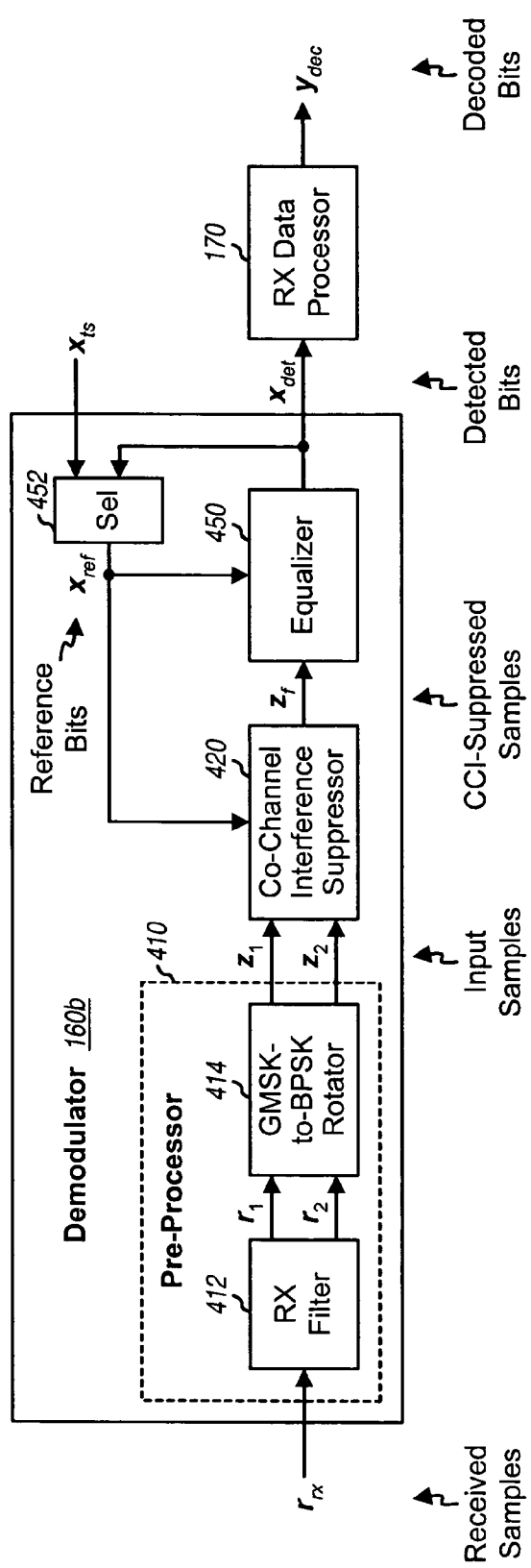
FIG. 4 shows a demodulator capable of performing co-channel interference suppression using virtual antennas.

FIG. 4 shows a demodulator 160b capable of performing co-channel interference suppression using virtual antennas. Receiver unit 154 may digitize the received GMSK signal at twice the sample rate and provide 2× oversampled received samples $r_{rx}$. Within a pre-processor 410, an RX filter 412 filters the received samples and provides a sequence of "early" samples $r_1$ and a sequence of "late" samples $r_2$. RX filter 412 may be a poly-phase filter or some other type of filter. A GMSK-to-BPSK rotator 414 performs phase rotation on each sequence of intermediate samples, $r_m$ for m=1, 2, as shown in equation (4), and provides a corresponding sequence of input samples $z_m$.

Figure 5:
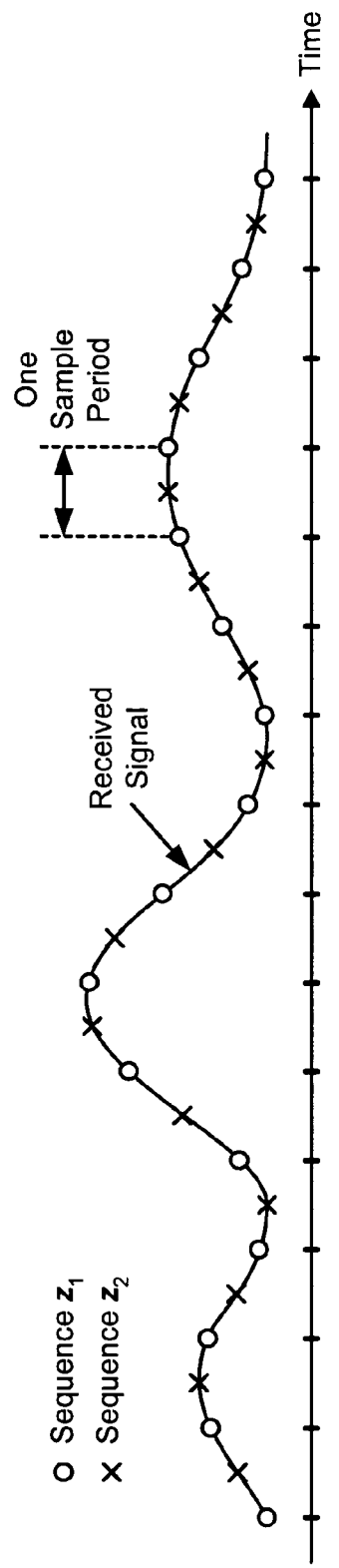
FIG. 5 shows two sample sequences obtained via 2× over-sampling.

FIG. 5 shows the two sequences of input samples $z_1$ and $z_2$ obtained with 2× oversampling. The early samples in the first sequence $z_1$ are offset by a half sample period from the late samples in the second sequence $z_2$.

Referring back to FIG. 4, a co-channel interference suppressor 420 receives the two input sample sequences $z_1$ and $z_2$, suppresses co-channel interference from the undesired transmitter(s), and provides a sequence of CCI-suppressed samples $z_f$. An equalizer 450 performs equalization on the CCI-suppressed samples $z_f$ to suppress intersymbol interference and provides detected bits $x_{det}$. Interference suppressor 420 and equalizer 450 may be implemented in various manners, and several exemplary designs are described below.

Demodulator 160b may perform co-channel interference suppression and equalization for a single iteration or for multiple iterations to improve performance. Each iteration of the co-channel interference suppression and equalization is called an outer iteration. A selector (Sel) 452 receives the training sequence $x_{ts}$ and the detected bits $x_{det}$ and provides reference bits $x_{ref}$ for interference suppressor 420 and equalizer 450. In general, selector 452 may provide the same reference bits to both interference suppressor 420 and equalizer 450 (as shown in FIG. 4) or different reference bits to interference suppressor 420 and equalizer 450 (not shown in FIG. 4). In an embodiment, selector 452 provides the training sequence as the reference bits for the first outer iteration, and provides the training sequence and the detected bits as the reference bits for each subsequent outer iteration. After all of the outer iterations are completed, RX data processor 170 processes the detected bits for the final outer iteration and generates the decoded data $y_{dec}$.

The received GMSK signal may be assumed to contain the GMSK signal for desired transmitter 110 and an interfering GMSK signal for one undesired transmitter. The input samples from pre-processor 410 may then be expressed as:

$$z_m = a \otimes h_m + b(n) \otimes g_m + n_m, \text{ for } m=1, 2, \qquad \text{Eq (6)}$$

where a and b represent the input bit sequences at the desired and undesired transmitters, respectively;

$h_m$ and $g_m$ represent the effective channel impulse responses for the desired and undesired transmitters, respectively, for sequence m; and $n_m$ represents the total noise observed by sequence m.

Figure 6A:
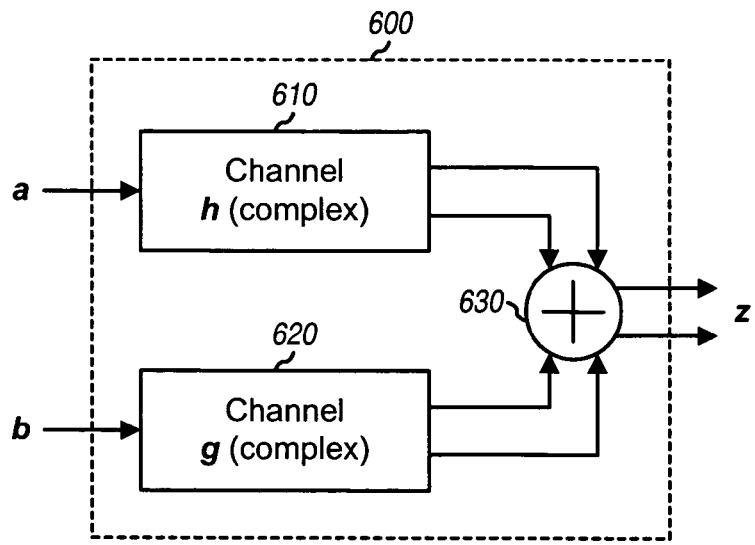
FIG. 6A shows a model for two transmitters with binary phase shift keying (BPSK).

FIG. 6A shows a model 600 for two transmitters with BPSK. With BPSK, each transmitter transmits real-valued bits instead of complex-valued symbols. For model 600, the real-valued input bits a for the desired transmitter are provided to a channel 610 having a complex channel impulse response h. The real-valued input bits b for the undesired transmitter are provided to a channel 620 having a complex channel impulse response g. The outputs of channels 610 and 620 are added by a summer 630 to generate complex-valued samples z.

Figure 6B:
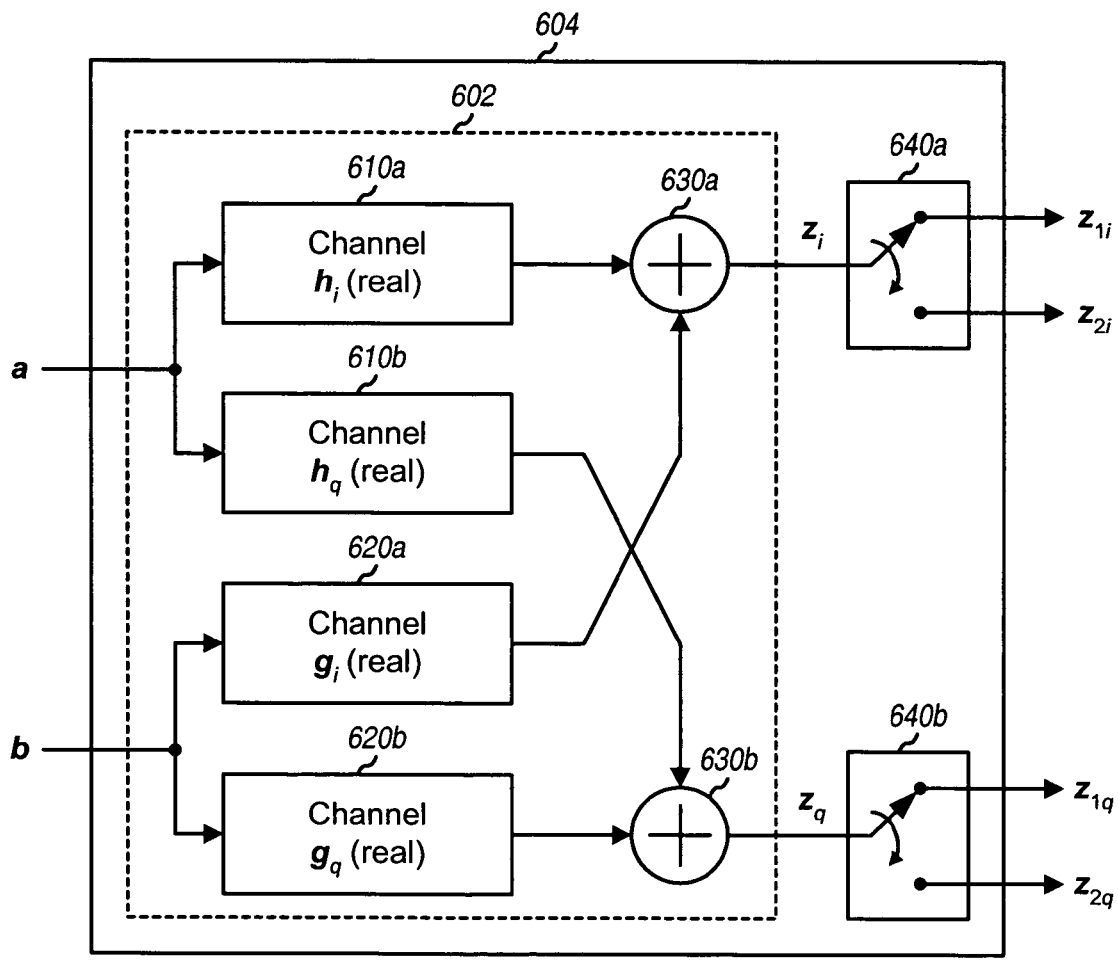
FIG. 6B shows MIMO models for two transmitters with BPSK.

FIG. 6B shows MIMO models 602 and 604 for two transmitters with BPSK. The complex channel impulse response h has a real part $h_i$ and an imaginary part $h_q$. The complex channel impulse response g also has a real part $g_i$ and an imaginary part $g_q$. Channel 610 in FIG. 6A is decomposed into a channel 610a having a real channel impulse response $h_i$ and a channel 610b having a real channel impulse response $h_q$. Similarly, channel 620 is decomposed into a channel 620a having a real channel impulse response $g_i$ and a channel 620b having a real channel impulse response $g_q$. The real-valued input bits a for the desired transmitter are provided to both channels 610a and 610b. The real-valued input bits b for the undesired transmitter are provided to both channels 620a and 620b. A summer 630a sums the outputs of channels 610a and 620a and provides real-valued inphase samples $z_i$. A summer 630b sums the outputs of channels 610b and 620b and provides real-valued quadrature samples $z_q$. The inphase samples $z_i$ and the quadrature samples $z_q$ are the real and imaginary parts, respectively, of the complex-valued samples z. MIMO model 602 shows a two-input two-output (2×2) system being formed with a and b as the two inputs and $z_i$ and $z_q$ as the two outputs. Two virtual antennas are effectively formed by the real part $z_i$ and the imaginary part $z_q$ of z.

The $z_i$ and $z_q$ samples may be oversampled at multiple (e.g., two) times the sample rate. A demultiplexer 640a demultiplexes the inphase samples $z_i$ into two sequences $z_{1i}$ and $z_{2i}$, with each sequence containing inphase samples at the sample rate. Similarly, a demultiplexer 640b demultiplexes the quadrature samples $z_q$ into two sequences $z_{1q}$ and $z_{2q}$, with each sequence containing quadrature samples at the sample rate. MIMO model 604 shows a two-input four-output (2×4) system being formed with a and b as the two inputs and $z_{1i}$, $z_{1q}$, $z_{2i}$ and $z_{2q}$ as the four outputs. Four virtual antennas are effectively formed by 2× oversampling the real part $z_i$ and the imaginary part $z_q$ of z.

Figure 7A:
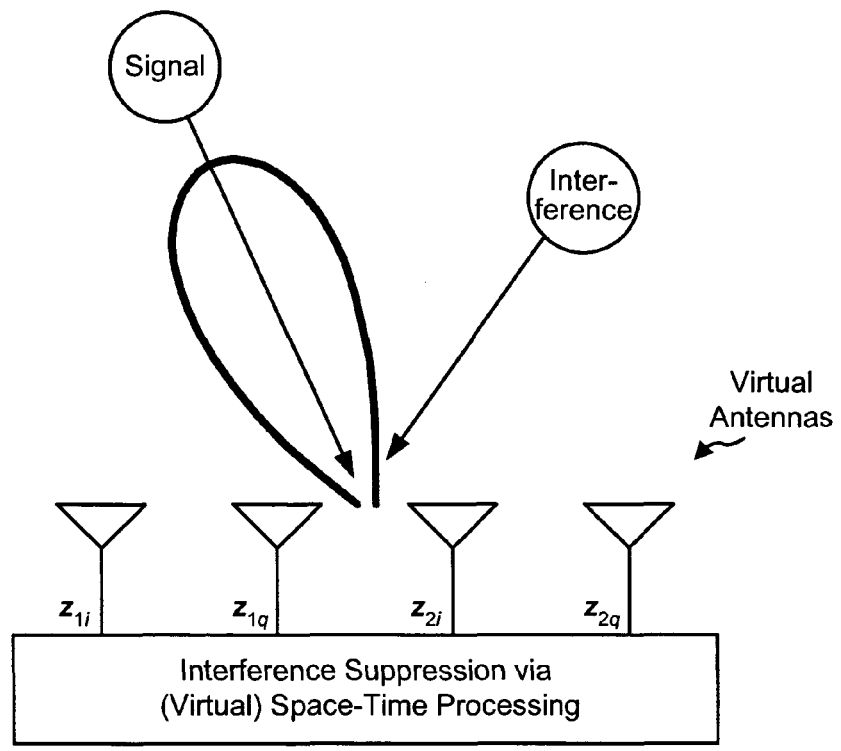
FIG. 7A shows space-time processing for interference suppression with virtual antennas.

FIG. 7A shows space-time processing for co-channel interference suppression with MIMO model 604 in FIG. 6B. Four virtual antennas are formed with the four real-valued input sample sequences $z_{1i}$, $z_{1q}$, $z_{2i}$ and $z_{2q}$ obtained with 2× oversampling and real/imaginary decomposition. Using MIMO model 604, appropriate weights may be applied to the four virtual antennas to form a beam toward the direction of the desired transmitter and to create a beam null toward the direction of the undesired transmitter. In general, co-channel interference suppression may be achieved with one or multiple actual antennas at the receiver by using space-time processing, where "space" may be virtually achieved with the inphase and quadrature components and "time" may be achieved using late and early samples.

Figure 7C:
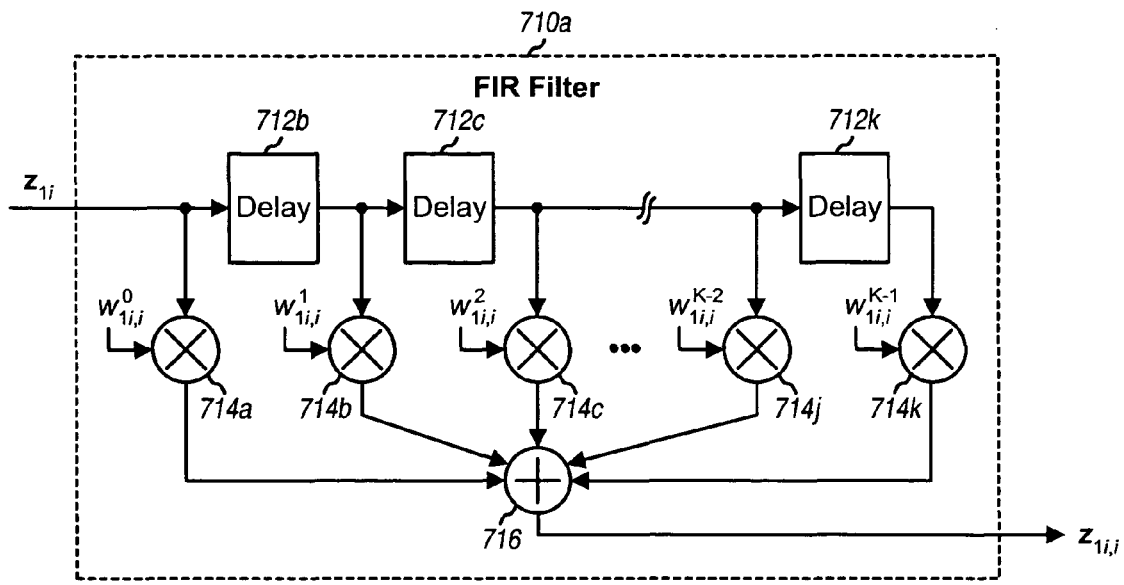
FIG. 7C shows a finite impulse response (FIR) filter within the MIMO filter.
Figure 7B:
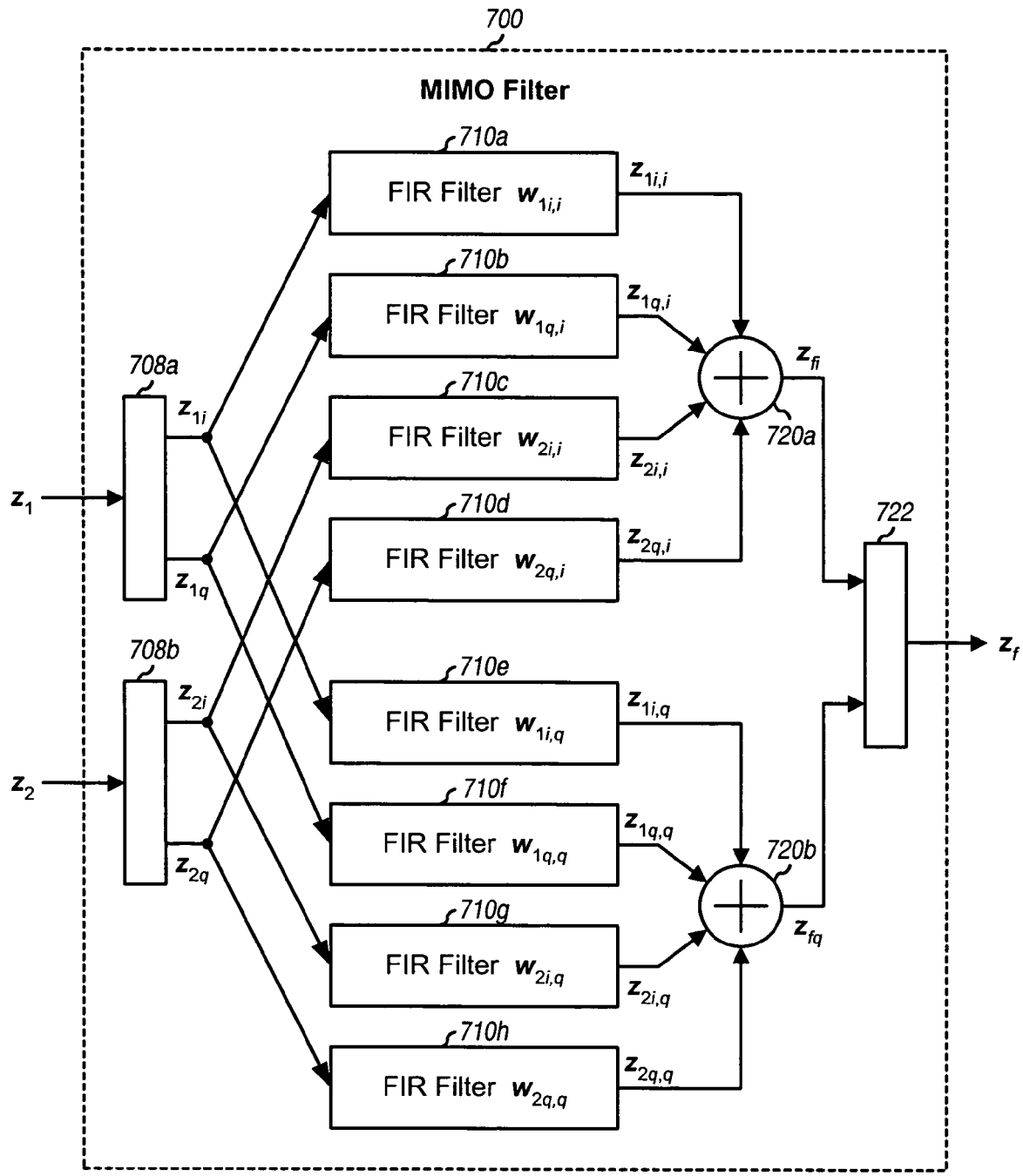
FIG. 7B shows a MIMO filter that performs space-time processing on two complex-valued input sample sequences for co-channel interference suppression.

FIG. 7B shows a MIMO filter 700 that performs space-time processing on two complex-valued input sample sequences $z_1$ and $z_2$ for co-channel interference suppression. A unit 708a receives the complex-valued input sample sequence $z_1$, provides the inphase samples $z_{1i}$ to FIR filters 710a and 710e, and provides the quadrature samples $z_{1q}$ to FIR filters 710b and 710f. A unit 708b receives the complex-valued input sample sequence $z_2$, provides the inphase samples $z_{2i}$ to FIR filters 710c and 710g, and provides the quadrature samples $z_{2q}$ to FIR filters 710d and 710h. Each FIR filter 710 has K taps, where $K \geq 1$ and may be selected based on the lengths of the channel impulse responses for the desired and undesired transmitters and/or other considerations.

FIG. 7C shows an embodiment of FIR filter 710a within MIMO filter 700. FIR filter 710a has K−1 series-coupled delay elements 712b through 712k, K multipliers 714a through 714k, and a summer 716. Each delay element 712 provides one sample period (T) of delay. Multiplier 714a receives the input samples $z_{1i}$, and multipliers 714b through 714k receive the outputs of delay elements 712b through 712k, respectively. Multipliers 714a through 714k also receive K weights. Each multiplier 714 multiplies its input samples with its weight and provides output samples. For each sample period, summer 716 sums the outputs of all K multipliers 714a through 714k and provides an output sample for that sample period. FIR filters 710b through 710k may each be implemented in the same manner as FIR filter 710a.

Referring back to FIG. 7B, each FIR filter 710 filters its input samples with its set of K real weights w. The weights for FIR filters 710a through 710h are derived to pass the signal from the desired transmitter and to suppress the co-channel interference from the undesired transmitter. A summer 720a sums the outputs of FIR filters 710a through 710d and provides inphase CCI-suppressed samples $z_{fi}$. A summer 720b sums the outputs of FIR filters 710e through 710h and provides quadrature CCI-suppressed samples $z_{fq}$. The inphase samples $z_{fi}$ and the quadrature samples $z_{fq}$ may be expressed as:

$$z_{fi} = z_{1i} \otimes w_{1i,i} + z_{1q} \otimes w_{1q,i} + z_{2i} \otimes w_{2i,i} + z_{2q} \otimes w_{2q,i},$$
and
Eq (7a)

$$z_{fq} = z_{1i} \otimes w_{1i,q} + z_{1q} \otimes w_{1q,q} + z_{2i} \otimes w_{2i,q} + z_{2q} \otimes w_{2q,q},$$
Eq (7b)

where $w_{1i,i}$, $w_{1q,i}$, $w_{2i,i}$ and $w_{2q,i}$ are four sets of weights for FIR filters 710a, 710b, 710c, and 710d, respectively, and $w_{1i,q}$, $w_{1q,q}$, $w_{2i,q}$ and $w_{2q,q}$ are four sets of weights for FIR filters 710e, 710f, 710g, and 710h, respectively. Each set contains K weights for the K FIR filter taps. A unit 722 receives the inphase samples $z_{fi}$ and the quadrature samples $z_{fq}$ and provides complex-valued CCI-suppressed samples $z_f$.

MIMO filter 700 may also be implemented with infinite impulse response (IIR) filters or some other type of filter.

In general, multiple virtual antennas may be obtained by (1) oversampling the received signal for each actual antenna to obtain multiple sequences of complex-valued samples and/or (2) decomposing the complex-valued samples into real and imaginary parts. FIG. 6B shows the modeling of two transmitters and a single-antenna receiver as a 2×2 system (with real/imaginary decomposition) and as a 2×4 system (with real/imaginary decomposition and 2× oversampling). For a receiver with $N_{ant}$ actual antennas, $2N_{ant}$ virtual antennas may be obtained via real/imaginary decomposition, $N_{ant} \cdot N_{os}$ virtual antennas may be obtained via $N_{os}$ times oversampling, and $2 \cdot N_{ant} \cdot N_{os}$ virtual antennas may be obtained via real/imaginary decomposition and $N_{os}$ times oversampling. If $N_{os} > 2$, then more than two sequences of complex-valued samples may be generated and used to form more than four outputs (and hence more than four virtual antennas) in a MIMO model. For simplicity, the following description is for a receiver with one actual antenna and 2× oversampling. The sequence of received samples $r_{rx}$ is processed to generate four sequences of real-valued input samples $z_{1i}$, $z_{1q}$, $z_{2i}$ and $z_{2q}$.

Figure 8:
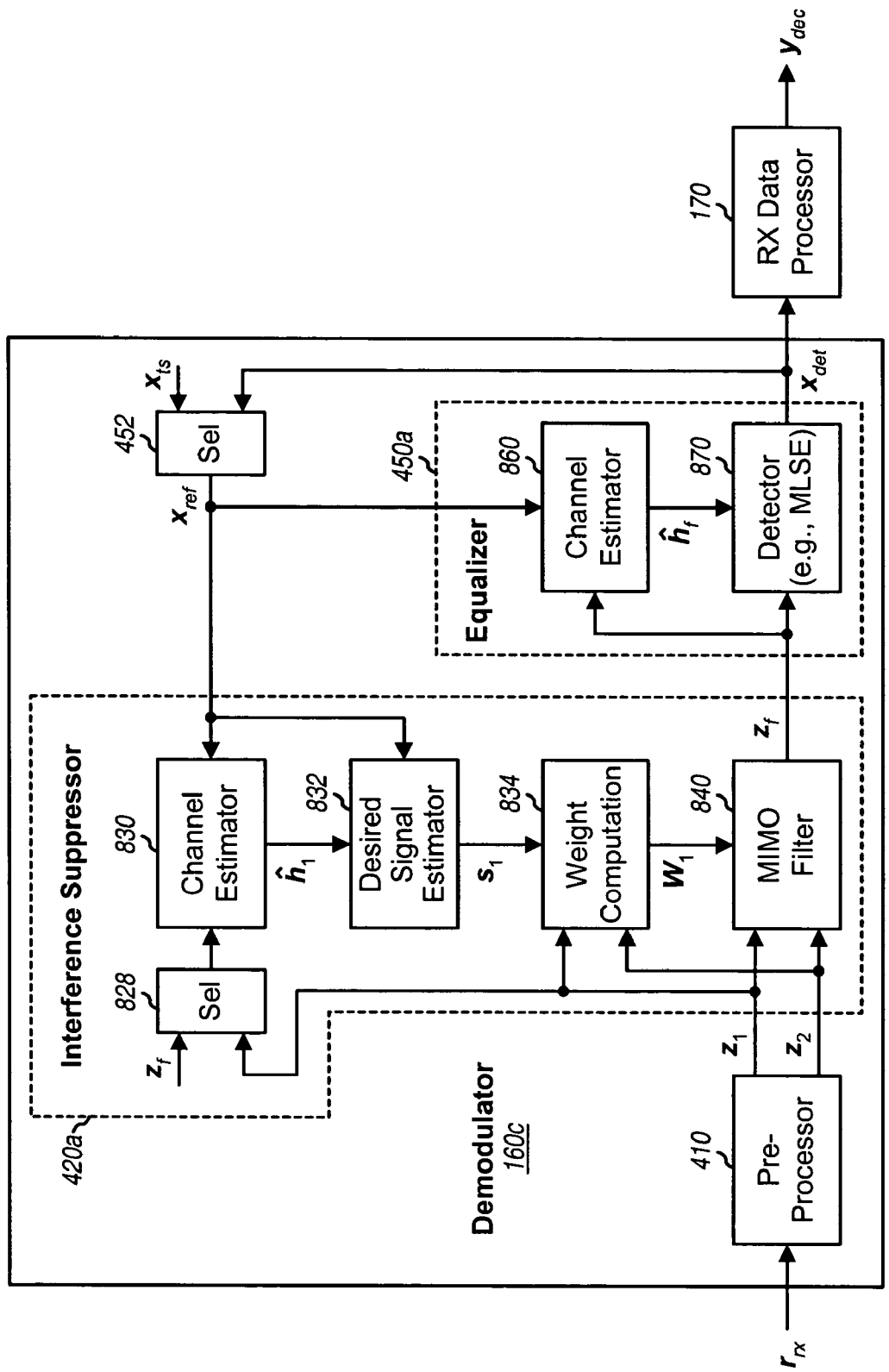
FIG. 8 shows a demodulator that suppresses co-channel interference using virtual antennas.

FIG. 8 shows an embodiment of a demodulator 160c that suppresses co-channel interference using virtual antennas. Demodulator 160c may be used for demodulator 160 in FIG. 1. Within demodulator 160c, pre-processor 410 processes the received samples $z_{rx}$ and provides two sequences of complex-valued input samples $z_1$ and $z_2$. Demodulator 160c includes a co-channel interference suppressor 420a and an equalizer 450a. Interference suppressor 420a includes a selector 828, a channel estimator 830, a desired signal estimator 832, a weight computation unit 834, and a MIMO filter 840. Equalizer 450a includes a channel estimator 860 and a detector 870 (e.g., an MLSE).

Interference suppressor 420a may perform channel estimation and MIMO filtering for a single iteration or for multiple iterations to improve performance. Each iteration of the channel estimation and MIMO filtering is called an inner iteration.

Selector 828 receives one sequence of complex-valued input samples (e.g., the first sequence $z_1$) from pre-processor 410 and the CCI-suppressed sample sequence $z_f$ from MIMO filter 840, provides the input sample sequence to channel estimator 830 for the first inner iteration, and provides the CCI-suppressed sample sequence for each subsequent inner iteration. Channel estimator 830 receives the sequence of complex-valued samples (e.g., the first sequence $z_1$ for the first inner iteration) from selector 828 and the reference bits $x_{ref}$ from selector 452 and derives an effective channel impulse response estimate (e.g., $\hat{h}_1$) for that sequence. Channel estimator 830 may implement a least-squares (LS) estimator, a linear minimum mean square error (LMMSE), an adaptive filter, or some other type of estimator. In an embodiment that is described below, channel estimator 830 is an LS channel estimator. The input samples for the first sequence $z_1$ may be expressed in vector and matrix form as follows:

$$\underline{z}_1 = \underline{X} \cdot \underline{h}_1 + \underline{n}_1, \qquad \text{Eq (8)}$$

where $\underline{h}_1 = [h_0 \, h_1 \ldots h_{L-1}]^T$ is an L×1 vector with L channel taps for the effective channel impulse response for the desired transmitter for the first sequence $z_1$, where "$T$" denotes a transpose;

$\underline{X}$ is a P×L matrix containing the reference bits $x_{ref}$, where P>1;

$\underline{z}_1$ is a P×1 vector with P input samples in the first sequence $z_1$; and $\underline{n}_1$ is a P×1 vector of total noise and interference for the first sequence $z_1$.

The effective channel impulse response contains L channel taps $h_0$ through $h_{L-1}$, where $L \geq 1$ and each channel tap $h_l$ is a complex value.

The reference bits available for channel estimation are arranged into P overlapping segments, with each segment containing L reference bits. The rows of matrix $\underline{X}$ are formed by the P segments, as follows:

$$\underline{X} = \begin{bmatrix} x_{ref,L-1} & \cdots & x_{ref,1} & x_{ref,0} \\ x_{ref,L} & \cdots & x_{ref,2} & x_{ref,1} \\ \vdots & \ddots & \vdots & \vdots \\ x_{ref,P-L-2} & \cdots & x_{ref,P} & x_{ref,P-1} \end{bmatrix}, \qquad \text{Eq (9)}$$

where $x_{ref,0}$ through $x_{ref,P-L-2}$ are P−L+1 reference bits in $x_{ref}$.

The LS channel estimator derives a channel impulse response estimate based on the following LS criterion:

$$\underline{h}_{ls,1} = \underset{\underline{h}_1}{\arg\min} \| \underline{z}_1 - \underline{X} \cdot \underline{h}_1 \|^2. \qquad \text{Eq (10)}$$

Equation (10) indicates that $\underline{h}_{ls,1}$ is equal to a hypothesized channel impulse response $\underline{h}_1$ that minimizes the squared error between the input samples $\underline{z}_1$ and the samples generated with that hypothesized channel impulse response (or $\underline{X} \cdot \underline{h}_1$).

The solution to equation (10) may be expressed as:

$$\underline{h}_{ls,1} = (\underline{X}^H \cdot \underline{X})^{-1} \cdot \underline{X}^H \cdot \underline{z}_1, \qquad \text{Eq (11)}$$

where "$H$" denotes the conjugate transpose. If P=16, L≦10, and the middle 16 bits (or parts 'B', 'C', and 'A') of the training sequence are used for channel estimation, then $\underline{X}^H \cdot \underline{X}$ is equal to the identity matrix, and the channel impulse response estimate may be simplified as:

$$\underline{h}_{ls,1} = \frac{1}{P} \cdot \underline{X}^H \cdot \underline{z}_1.$$

In this case, each channel tap in $\underline{h}_{ls,1}$ may be obtained by correlating P input samples with a different segment of P reference bits. The LS channel estimate $\underline{h}_{ls,1}$ is provided as the channel estimate $\hat{h}_1$ for the first sequence $z_1$.

For the first outer iteration, matrix $\underline{X}$ is formed based on the bits in the training sequence $x_{ts}$, and $\underline{h}_{ls,1}$ is derived based on the received training bits. For each subsequent outer iteration, matrix $\underline{X}$ is formed based on the training bits $x_{ts}$ and the detected bits $x_{det}$, and P is a larger dimension.

Desired signal estimator 832 receives the effective channel impulse response estimate $\hat{h}_1$ for the desired transmitter for the first sequence $z_1$ and the reference bits $x_{ref}$. Signal estimator 832 generates a desired signal estimate $s_1$ for the desired transmitter by convolving the reference bits with the channel estimate, as follows:

$$s_1 = x_{ref} \otimes \hat{h}_1. \qquad \text{Eq (12)}$$

The desired signal estimate $s_1$ is an estimate of $a \otimes h_m$ in equation (6), which is the signal component for the desired transmitter.

Weight computation unit 834 receives the desired signal estimate $s_1$ and the two input sample sequences $z_1$ and $z_2$ and derives the weights $W_1$ for MIMO filter 840. MIMO filter 840 may be implemented with MIMO filter 700 having a bank of eight FIR filters 710*a* through 710*h*. Unit 834 may compute the weights $W_1$ based on minimum mean square error (MMSE), least squares (LS), or some other criterion. In an embodiment that is described below, unit 834 derives the weights based on the MMSE criterion.

The output of MIMO filter 700 or 840 may be expressed in matrix form as follows:

$$\underline{z}_f = \underline{W} \cdot \underline{Z}, \qquad \text{Eq (13)}$$

where $\underline{Z}$ is a 4K×Q matrix of inphase and quadrature samples in sequences $z_1$ and $z_2$;

$\underline{W}$ is a 2×4K matrix containing the weights for the FIR filters;

$\underline{z}_f$ is a 2×Q matrix of CCI-suppressed samples from the MIMO filter;

K is the number of taps for each FIR filter within MIMO filter 700; and

Q determines the number of CCI-suppressed samples used to derive the FIR filter weights.

Matrices $\underline{z}_f$, $\underline{W}$, and $\underline{Z}$ may be defined in various manners. An exemplary embodiment for equation (13) is described below.

Matrix $\underline{Z}$ may be defined with the following form:

$$\underline{Z} = \begin{bmatrix} z_{1i}(t) & z_{1i}(t-1) & \cdots & z_{1i}(t-Q-1) \\ z_{1q}(t) & z_{1q}(t-1) & \cdots & z_{1q}(t-Q-1) \\ z_{2i}(t) & z_{2i}(t-1) & \cdots & z_{2i}(t-Q-1) \\ z_{2q}(t) & z_{2q}(t-1) & \cdots & z_{2q}(t-Q-1) \\ \vdots & \vdots & \ddots & \vdots \\ z_{1i}(t-K-1) & z_{1i}(t-K-2) & \cdots & z_{1i}(t-Q-K-2) \\ z_{1q}(t-K-1) & z_{1q}(t-K-2) & \cdots & z_{1q}(t-Q-K-2) \\ z_{2i}(t-K-1) & z_{2i}(t-K-2) & \cdots & z_{2i}(t-Q-K-2) \\ z_{2q}(t-K-1) & z_{2q}(t-K-2) & \cdots & z_{2q}(t-Q-K-2) \end{bmatrix}, \quad \text{Eq (14)}$$

where $z_{1i}(t)$ and $z_{1q}(t)$ are respectively the real and imaginary parts of the complex-valued input sample $z_1(t)$ in sequence $z_1$ for sample period t; and $z_{2i}(t)$ and $z_{2q}(t)$ are respectively the real and imaginary parts of the complex-valued input sample $z_2(t)$ in sequence $z_2$ for sample period t.

Each column of $\underline{Z}$ contains 4K entries for the real and imaginary parts of 2K complex-valued input samples obtained in K sample periods. Adjacent columns of $\underline{Z}$ are offset by one sample period.

Matrix $\underline{W}$ may be defined with the following form:

$$\underline{W} = \begin{bmatrix} w_{1i,i}^0 & w_{1q,i}^0 & w_{2i,i}^0 & w_{2q,i}^0 & \cdots & w_{1i,i}^{K-1} & w_{1q,i}^{K-1} & w_{2i,i}^{K-1} & w_{2q,i}^{K-1} \\ w_{1i,q}^0 & w_{1q,q}^0 & w_{2i,q}^0 & w_{2q,q}^0 & \cdots & w_{1i,q}^{K-1} & w_{1q,q}^{K-1} & w_{2i,q}^{K-1} & w_{2q,q}^{K-1} \end{bmatrix}, \quad \text{Eq (15)}$$

where $w_{1i,i}^k$, $w_{1q,i}^k$, $w_{2i,i}^k$ and $w_{2q,i}^k$ are the weights for the k-th tap of FIR filters 710a, 710b, 710c and 710d, respectively; and $w_{1i,q}^k$, $w_{1q,q}^k$, $w_{2i,q}^k$ and $w_{2q,q}^k$ are the weights for the k-th tap of FIR filters 710e, 710f, 710g and 710h, respectively.

The weights $w_{1i,i}^k$, $w_{1q,i}^k$, $w_{2i,i}^k$ and $w_{2q,i}^k$ are used to derive the real part of a CCI-suppressed sample. The weights $w_{1i,q}^k$, $w_{1q,q}^k$, $w_{2i,q}^k$ and $w_{2q,q}^k$ are used to derive the imaginary part of the CCI-suppressed sample.

Matrix $\underline{z}_f$ may be defined with the following form:

$$\underline{z}_f = \begin{bmatrix} z_{fi}(t) & z_{fq}(t) \\ z_{fi}(t-1) & z_{fq}(t-1) \\ \vdots & \vdots \\ z_{fi}(t-Q-1) & z_{fq}(t-Q-1) \end{bmatrix}, \quad \text{Eq (16)}$$

where $z_{fi}(t)$ and $z_{fq}(t)$ are the real and imaginary parts of the complex-valued CCI-suppressed sample $z_f(t)$ for sample period t. The (i,j)-th entry of $\underline{z}_f$ is obtained by multiplying the i-th row of $\underline{W}$ with the j-th column of $\underline{Z}$. Each row of $\underline{z}_f$ represents a complex-valued CCI-suppressed sample for one sample period.

Weight computation unit 834 derives the weights for the FIR filters within MIMO filter 840 based on the following MMSE criterion:

$$\underline{W}_{mmse} = \arg\min_{\underline{w}} \|\underline{s} - \underline{W} \cdot \underline{Z}\|^2, \quad \text{Eq (17)}$$

where $\underline{s}$ is a 2×Q matrix containing Q complex-valued samples in the desired signal estimate $s_1$ provided by signal estimator 832. Equation (17) indicates that $\underline{W}_{mmse}$ contains the hypothesized weights that minimize the mean squared error between the desired signal estimate $\underline{s}$ and the CCI-suppressed samples generated with the hypothesized weights (or $\underline{W} \cdot \underline{Z}$).

The solution to equation (17) may be expressed as:

$$\underline{W}_{mmse} = \underline{s} \cdot \underline{Z}^H \cdot (\underline{Z} \cdot \underline{Z}^H)^{-1}. \quad \text{Eq (18)}$$

The MMSE weights $\underline{W}_{mmse}$ generated based on the desired signal estimate $s_1$ are denoted as $W_1$. Unit 834 may compute new filter weights for each inner iteration of each outer iteration based on a new desired signal estimate derived for that inner/outer iteration and the two input sample sequences $z_1$ and $z_2$.

MIMO filter 840 receives the two input sample sequences $z_1$ and $z_2$ and the filter weights $W_1$. MIMO filter 840 filters the input samples with the filter weights, as shown in FIG. 7B and equation set (7), and provides the CCI-suppressed samples $z_f$. MIMO filter 840 suppresses the interference component $b \otimes g_m$ from the undesired transmitter, which results in the CCI-suppressed samples $z_f$ having less co-channel interference. However, since the desired signal estimate $s_1$ has intersymbol interference due to the convolution with the channel estimate $\hat{h}_1$, and since the weights are optimized for the desired signal estimate $s_1$, the CCI-suppressed samples $z_f$ include intersymbol interference.

One or multiple inner iterations may be performed for each outer iteration. For the first inner iteration, the channel estimate $\hat{h}_1$ is derived based on the first sequence $z_1$ and used to generate the filter weights $W_1$. The CCI-suppressed samples $z_f$ are then generated based on the input sample sequences $z_1$ and $z_2$ and the filter weights $W_1$. For each subsequent inner iteration, a new channel estimate $\hat{h}_1$ is derived based on the CCI-suppressed samples $z_f$ and used to generate new filter weights $W_1$. New CCI-suppressed samples $z_f$ are then generated based on the same input sample sequences $z_1$ and $z_2$ and the new filter weights $W_1$. The new channel estimate $\hat{h}_1$ may have higher quality since it is derived based on the CCI-suppressed samples $z_f$ having co-channel interference suppressed.

Equalizer 450a receives and processes the CCI-suppressed samples $z_f$ from interference suppressor 420a and provides detected bits $x_{det}$. Within equalizer 450a, a channel estimator 860 receives the CCI-suppressed samples $z_f$ and the reference bits $x_{ref}$. Equalizer 450a derives an improved estimate of the effective channel impulse response h for the desired transmitter, e.g., based on the LS criterion as shown in equation (10), and provides the improved effective channel impulse response estimate $\hat{h}_f$ to detector 870. Channel estimators 830 and 860 operate in similar manner but on different input sequences. The channel estimate $\hat{h}_{1f}$ is typically of higher quality than the channel estimate $\hat{h}_1$ because co-channel interference has been suppressed in the sequence $z_f$ used to derive the channel estimate $\hat{h}_{1f}$.

Detector 870 performs detection on the CCI-suppressed samples $z_f$ with the improved channel estimate $\hat{h}_f$. Detector 870 may be implemented with an MLSE. In this case, detector 870 convolves hypothesized bits $\tilde{a}$ with the channel estimate $\hat{h}_f$ to generate hypothesized samples $\tilde{z}_f$, which may be expressed as: $\tilde{z}_f = \tilde{a} \otimes \hat{h}_f$. Detector 870 then computes a branch metric m(t) to be accumulated for each sample period t as follows:

$$m(t) = \underline{e}^T(t) \cdot \underline{e}(t), \qquad \text{Eq (19)}$$

where $$\underline{e}(t) = \begin{bmatrix} z_{fi}(t) \\ z_{fq}(t) \end{bmatrix} - \begin{bmatrix} \tilde{z}_{fi}(t) \\ \tilde{z}_{fq}(t) \end{bmatrix};$$

$z_{fi}(t)$ and $z_{fq}(t)$ are respectively the real and imaginary parts of the CCI-suppressed sample in sequence $z_f$ for sample period t; and $\tilde{z}_{fi}(t)$ and $\tilde{z}_{fq}(t)$ are respectively the real and imaginary parts of the hypothesized sample in sequence $\tilde{z}_f$ for sample period t.

Detector 870 provides the detected bits $x_{det}$ that are deemed most likely to have been transmitted based on the branch metrics.

The co-channel interference suppression and equalization may be performed once on the input samples $z_1$ and $z_2$ to obtain the decoded bits $y_{dec}$. Multiple outer iterations of co-channel interference suppression and equalization may also be performed to improve performance. For the first outer iteration, selector 452 provides the training sequence as the reference bits. Channel estimator 830 derives the channel estimate $\hat{h}_1$ based on the training sequence. Signal estimator 832 generates the desired signal estimate $s_1$ based on the training sequence and the channel estimate $\hat{h}_1$. Unit 834 computes the filter weights $W_1$ based on the desired signal estimate $s_1$. Channel estimator 860 also derives the improved channel estimate $\hat{h}_f$ based on the training sequence.

For each subsequent outer iteration, selector 452 provides the training sequence and the detected bits as the reference bits. Channel estimator 830 derives the channel estimate $\hat{h}_1$ based on the training and detected bits. Signal estimator 832 generates a longer desired signal estimate $s_1$ based on the training and detected bits and the channel estimate $\hat{h}_1$. Unit 834 computes the filter weights $W_1$ based on the longer desired signal estimate. Channel estimator 860 also derives the improved channel estimate $\hat{h}_f$ based on the training and detected bits. After all of the outer iterations are completed, RX data processor 170 processes the final detected bits $x_{det}$ and provides the decoded data $y_{dec}$.

The embodiment in FIG. 8 performs co-channel interference suppression and intersymbol interference suppression separately. This may provide better performance since the MMSE-based MIMO filtering can more effectively deal with co-channel interference while the MLSE can more effectively deal with intersymbol interference. Both types of interference may also be suppressed jointly by providing the reference bits $x_{ref}$ (instead of the desired signal estimates $s_1$) to weight computation unit 834. Unit 834 would then compute the weights that minimize the mean square error between the samples from the MIMO filter and the reference bits.

Figure 9:
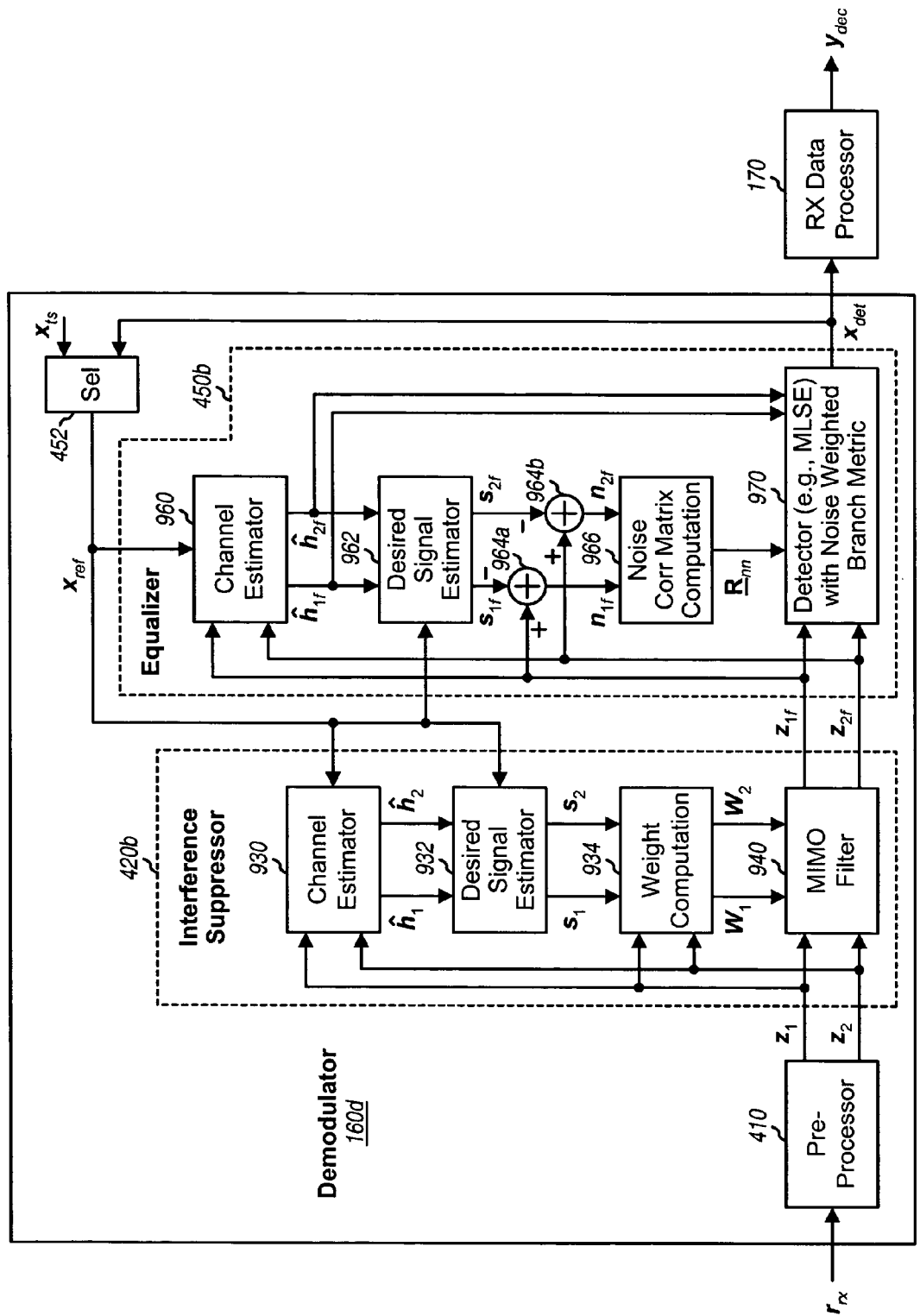
FIG. 9 shows a demodulator that suppresses co-channel interference using virtual antennas and performs detection with noise decorrelation.

FIG. 9 shows an embodiment of a demodulator 160c that suppresses co-channel interference using virtual antennas and further performs detection with noise decorrelation. For this embodiment, demodulator 160d includes (1) a co-channel interference suppressor 420b that suppresses co-channel interference and provides two sequences of CCI-suppressed samples $z_{1f}$ and $z_{2f}$ and (2) an equalizer 450b that performs data detection on both sequences $z_{1f}$ and $z_{2f}$ with noise decorrelation.

Within interference suppressor 420b, a channel estimator 930 receives the two complex-valued input sample sequences $z_1$ and $z_2$ and the reference bits $x_{ref}$ and derives effective channel impulse response estimates $\hat{h}_1$ and $\hat{h}_2$ for sequences $z_1$ and $z_2$, respectively. Each channel estimate $\hat{h}_m$, for m=1, 2, may be derived based on the input sample sequence $z_m$ and using the LS criterion, as shown in equation (10). A desired signal estimator 932 receives the reference bits $x_{ref}$ and the channel estimates $\hat{h}_1$ and $\hat{h}_2$ derives a desired signal estimate $s_1$ based on $x_{ref}$ and $\hat{h}_1$ as shown in equation (12), derives a desired signal estimate $s_2$ based on $x_{ref}$ and $\hat{h}_2$, and provides the two desired signal estimates $s_1$ and $s_2$.

A weight computation unit 934 receives the input sample sequences $z_1$ and $z_2$ and the desired signal estimates $s_1$ and $s_2$ and generates weights $W_1$ and $W_2$ for a MIMO filter 940. MIMO filter 940 may be implemented with two instances of MIMO filter 700 shown in FIG. 7B, which are called first and second MIMO filters. The first MIMO filter filters the input sample sequences $z_1$ and $z_2$ with the weights $W_1$, as shown in equation set (7), and provides a first CCI-suppressed sample sequence $z_{1f}$. The second MIMO filter filters the input sample sequences $z_1$ and $z_2$ with the weights $W_2$ and provides a second CCI-suppressed sample sequence $z_{2f}$. The first and second MIMO filters operate independently of one another. Unit 934 derives the weights $W_1$ such that the mean square error between the CCI-suppressed samples $z_{1f}$ and the desired signal estimate $s_1$ is minimized, as shown in equation (17). Unit 934 derives the weights $W_2$ such that the mean square error between the CCI-suppressed samples $z_{2f}$ and the desired signal estimate $s_2$ is minimized.

For clarity, FIG. 9 shows interference suppressor 420b performing one inner iteration of channel estimation and MIMO filtering. Interference suppressor 420b may also perform multiple inner iterations to improve performance. In this case, a selector can receive the two input sample sequences $z_1$ and $z_2$ from pre-processor 410 and the two CCI-suppressed sample sequences $z_{1f}$ and $z_{2f}$ from MIMO filter 940, provide the input sample sequences $z_1$ and $z_2$ to channel estimator 930 for the first inner iteration, and provide the CCI-suppressed sample sequences $z_{1f}$ and $z_{2f}$ for each subsequent inner iteration.

Within equalizer 450b, a channel estimator 960 receives the two CCI-suppressed sample sequences $z_{1f}$ and $z_{2f}$ and the reference bits $x_{ref}$ and derives improved effective channel impulse response estimates $\hat{h}_{1f}$ and $\hat{h}_{2f}$ for sequences $z_{1f}$ and $z_{2f}$ respectively. Each channel estimate $\hat{h}_{mf}$, for m=1, 2, may be derived based on CCI-suppressed sample sequence $z_{mf}$ and using the LS criterion, as shown in equation (10). The channel estimates $\hat{h}_{1f}$ and $\hat{h}_{2f}$ are typically of higher quality than the channel estimates $\hat{h}_1$ and $\hat{h}_2$ because co-channel interference has been suppressed in the sequences $z_{1f}$ and $z_{2f}$ used to derive the channel estimates $\hat{h}_{1f}$ and $\hat{h}_{2f}$.

A desired signal estimator 962 receives the reference bits $x_{ref}$ and the improved channel estimates $\hat{h}_{1f}$ and $\hat{h}_{2f}$ derives a desired signal estimate $s_{1f}$ based on $x_{ref}$ and $\hat{h}_{1f}$ as shown in equation (12), derives a desired signal estimate $s_{2f}$ based on $x_{ref}$ and $\hat{h}_{2f}$, and provides the two desired signal estimates $s_{1f}$ and $s_{2f}$. Signal estimators 932 and 962 operate in similar manner but with different channel estimates. The desired signal estimates $s_{1f}$ and $s_{2f}$ are typically of higher quality than the desired signal estimates $s_1$ and $s_2$ because of the improved channel estimates $\hat{h}_{1f}$ and $\hat{h}_{2f}$ used to derive the desired signal estimates $s_{1f}$ and $s_{2f}$.

A summer 964a subtracts the desired signal estimate $s_{1f}$ from the CCI-suppressed samples $z_{1f}$ and provides a noise estimate $n_{1f}$. A summer 964b subtracts the desired signal estimate $s_{2f}$ from the CCI-suppressed samples $z_{2f}$ and provides a noise estimate $n_{2f}$. The noise estimates may be expressed as:

$$n_{1f} = z_{1f} - s_{1f} \text{ and } n_{2f} = z_{2f} - s_{2f}. \qquad \text{Eq (20)}$$

A computation unit 966 computes a 4×4 noise correlation matrix $\underline{R}_{nn}$ based on the real and imaginary parts of the noise samples in $n_{1f}$ and $n_{2f}$ as follows:

$$\underline{R}_{nn} = \langle \underline{n}_t \cdot \underline{n}_t^T \rangle, \qquad \text{Eq (21)}$$

where $\underline{n}_t = [n_{1fi}(t) n_{1fq}(t) n_{2fi}(t) n_{2fq}(t)]^T$ is a 4×1 noise vector for sample period t;

$n_{1fi}(t)$ and $n_{1fq}(t)$ are the real and imaginary parts of the noise sample in $n_{1f}$ for sample period t;

$n_{2fi}(t)$ and $n_{2fq}(t)$ are the real and imaginary parts of the noise sample in $n_{2f}$ for sample period t; and $\langle \rangle$ denotes an averaging operation.

A detector 970 receives the CCI-suppressed sample sequences $z_{1f}$ and $z_{2f}$, the improved channel estimates $\hat{h}_{1f}$ and $\hat{h}_{2f}$, and the noise correlation matrix $\underline{R}_{nn}$. Detector 970 performs detection based on all of the inputs. Detector 970 may be implemented with an MLSE. In this case, detector 970 convolves hypothesized bits $\tilde{a}$ with the channel estimate $\hat{h}_{1f}$ to derive a first sequence of hypothesized samples $\tilde{z}_{1f}$ (or $\tilde{z}_{1f} = \tilde{a} \otimes \hat{h}_{1f}$). Detector 970 also convolves the hypothesized bits $\tilde{a}$ with the channel estimate $\hat{h}_{2f}$ to derive a second sequence of hypothesized samples $\tilde{z}_{2f}$ (or $\tilde{z}_{2f} = \tilde{a} \otimes \hat{h}_{2f}$). Detector 970 then computes the branch metric m(t) to be accumulated for each sample period t as follows:

$$m(t) = \underline{\tilde{e}}^T(t) \cdot \underline{R}_{nn}^{-1} \cdot \underline{\tilde{e}}(t), \qquad \text{Eq (22)}$$

$$\text{where } \underline{\tilde{e}}(t) = \begin{bmatrix} z_{1fi}(t) \\ z_{1fq}(t) \\ z_{2fi}(t) \\ z_{2fq}(t) \end{bmatrix} - \begin{bmatrix} \tilde{z}_{1fi}(t) \\ \tilde{z}_{1fq}(t) \\ \tilde{z}_{2fi}(t) \\ \tilde{z}_{2fq}(t) \end{bmatrix};$$

$z_{1fi}(t)$ and $z_{1fq}(t)$ are respectively the real and imaginary parts of the CCI-suppressed sample in sequence $z_{1f}$ for sample period t;

$z_{2fi}(t)$ and $z_{2fq}(t)$ are respectively the real and imaginary parts of the CCI-suppressed sample in sequence $z_{2f}$ for sample period t;

$\tilde{z}_{1fi}(t)$ and $\tilde{z}_{1fq}(t)$ are respectively the real and imaginary parts of the hypothesized sample in sequence $\tilde{z}_{1f}$ for sample period t; and $\tilde{z}_{2fi}(t)$ and $\tilde{z}_{2fq}(t)$ are respectively the real and imaginary parts of the hypothesized sample in sequence $\tilde{z}_{2f}$ for sample period t.

Equation (22) incorporates spatial decorrelation into the branch metrics used by the MLSE. Detector 970 provides the detected bits $x_{det}$ that are deemed most likely to have been transmitted based on the branch metrics.

For the embodiments shown in FIGS. 8 and 9, the same reference bits $x_{ref}$ are provided to both the co-channel interference suppressor and the equalizer and are used to derive the channel estimates and the desired signal estimates. In general, the same or different reference bits may be provided to the co-channel interference suppressor and the equalizer. Furthermore, the same or different reference bits may be used for channel estimation and desired signal estimation.

For the embodiment shown in FIG. 8, a new channel estimate and a new desired signal estimate are derived for each inner iteration of each outer iteration. For the embodiment shown in FIG. 9, a new channel estimate and a new desired signal estimate are derived for each outer iteration. In general, new or prior channel estimates may be used for each inner and outer iteration, and new or prior desired signal estimates may be used for each inner and outer iteration. For example, the channel estimates $\hat{h}_1$ and $\hat{h}_2$ may be derived once based on the training sequence and used for all outer iterations.

For the embodiments shown in FIGS. 4, 8 and 9, the detected bits $x_{det}$ from the equalizer are used to derive the channel estimates (e.g., $\hat{h}_1$, $\hat{h}_2$, $\hat{h}_{1f}$ and $\hat{h}_{2f}$ in FIG. 9) and the desired signal estimates (e.g., $s_1$, $s_2$, $s_{1f}$ and $s_{2f}$ in FIG. 9) for a subsequent outer iteration. Some of the detected bits may be of low quality and would then degrade the quality of the channel estimates and the desired signal estimates. Improved performance may be achieved by identifying detected bits of low quality and selectively discarding these bits.

Figure 10:
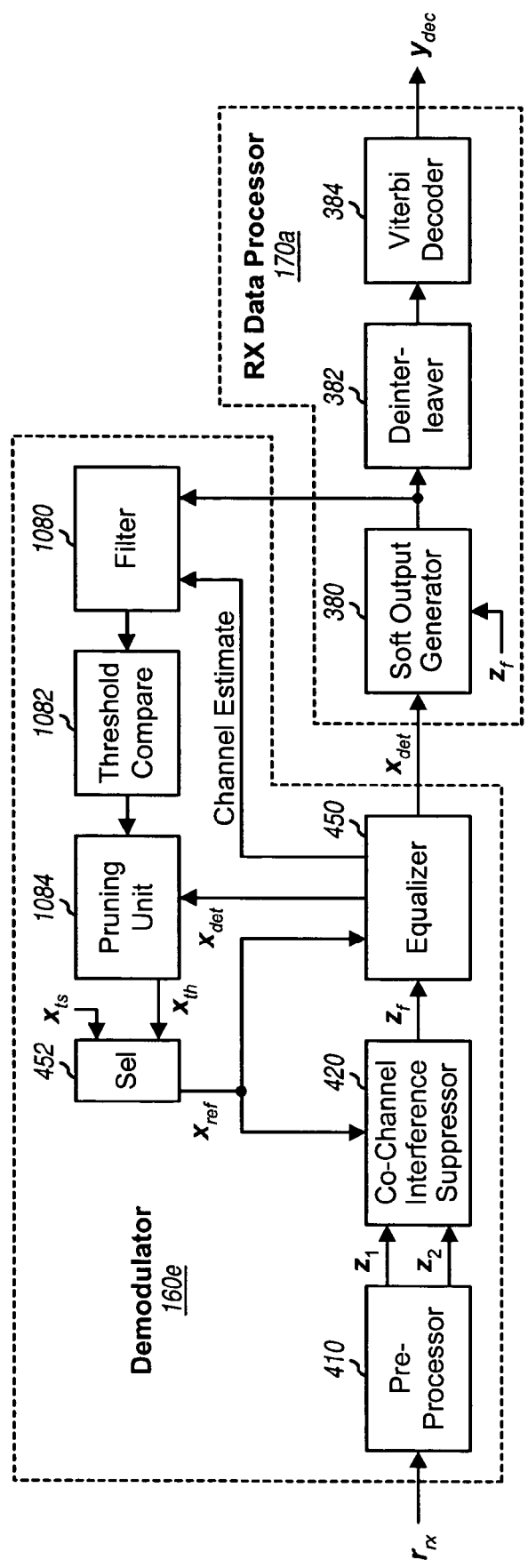
FIG. 10 shows a demodulator that suppresses interference using bit pruning.

FIG. 10 shows an embodiment of a demodulator 160e that performs interference suppression using bit pruning. Demodulator 160e includes all of the elements of demodulator 160b in FIG. 4. However, demodulator 160e utilizes a different feedback mechanism for the reference bits.

Within demodulator 160e, a filter 1080 receives the soft decisions from soft output generator 380 and a channel estimate (e.g., $\hat{h}_f$) from equalizer 450. Each soft decision indicates the confidence in a corresponding detected bit. Filter 1080 may be implemented with an L-tap FIR filter having a length corresponding to the length of the channel estimate. In an embodiment, the weights q for the L taps of the FIR filter are derived based on the L taps of the channel estimate, as follows:

$$q_k = \frac{|h_k|^2}{H_{tot\_energy}}, \text{ for } k = 0, \ldots, L-1, \qquad \text{Eq (23)}$$

where $h_k$ is the k-th tap of the channel estimate;

$$H_{tot\_energy} = \sum_{k=0}^{L-1} |h_k|^2$$

is the total energy of the L taps of the channel estimate; and $q_k$ is the weight for the k-th tap of the FIR filter.

With the weights generated in accordance with equation (23), filter 1080 implements a channel energy filter having normalized filter taps so that $$\sum_{k=0}^{L-1} q_k = 1.$$

Filter 1080 filters the magnitude of the soft decisions with its weights q and provides filtered symbols. A threshold compare unit 1082 compares each filtered symbol against a threshold value and indicates whether the filtered symbol is greater than the threshold value. Because of the normalization in equation (23), the threshold value may be set to a predetermined value (e.g., −10 decibel) that is independent of the actual taps for the channel estimate. The threshold value may be determined by computer simulation, empirical measurements, and so on.

A pruning unit 1084 receives the indications from threshold compare unit 1082 and the detected bits $x_{det}$ from equalizer 450 and provides unpruned bits $x_{th}$, which may be used as the reference bits for channel estimation and desired signal estimation. Unit 1084 generates the unpruned bits in a manner to account for the processing performed by interference suppressor 420 and equalizer 450. As an example, for each filtered symbol that is deemed to be of poor quality, a column of matrix $\underline{X}$ corresponding to that filtered symbol may be deleted (or set to all zeros) and not used for channel estimation. The overall effect of bit pruning is to use detected bits having good quality for co-channel interference suppression and equalization and to remove (or prune) detected bits with poor quality from being used. The channel energy filter removes poor quality detected bits only when these bits have a relatively large impact, e.g., when these bits are multiplied with a large channel tap. Selector 452 receives the training bits $x_{ts}$ and the unpruned bits $x_{th}$, provides the training bits as the reference bits $x_{ref}$ for the first outer iteration, and provides the training bits and the unpruned bits as the reference bits for each subsequent outer iteration.

FIG. 10 shows a specific embodiment for determining the quality of the equalizer output and for generating the reference bits based on the determined quality. The quality of the equalizer output may also be determined in other manners using other detection schemes. The reference bits may also be generated in other manners.

For the embodiments shown in FIGS. 4, 8, 9 and 10, the unpruned or pruned detected bits $x_{det}$ from the equalizer are used in each subsequent outer iteration to derive the channel estimates and the desired signal estimates. Improved performance may be achieved by using the error correction capability of the forward error correction (FEC) code to feed back higher quality bits for co-channel interference suppression and equalization.

Figure 11:
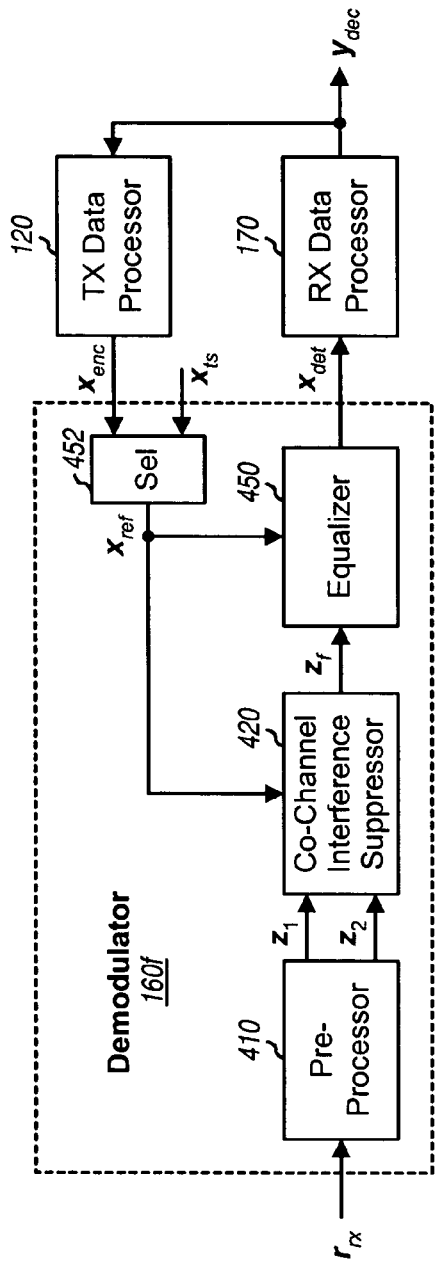
FIG. 11 shows a demodulator that suppresses interference using re-encoded bits.

FIG. 11 shows an embodiment of a demodulator 160*f* that performs interference suppression using re-encoded bits. Demodulator 160*f* includes all of the elements of demodulator 160*b* in FIG. 4. However, demodulator 160*e* utilizes a different feedback mechanism that uses re-encoded bits.

For each outer iteration except for the last outer iteration, RX data processor 170 processes the detected bits $x_{det}$ from demodulator 160*f* and provides decoded bits $y_{dec}$. TX data processor 120 re-encodes and interleaves the decoded bits $y_{dec}$ in the same manner performed by transmitter 110 and generates re-encoded bits $x_{enc}$. The re-encoded bits are typically of higher quality than the detected bits $x_{det}$ because the Viterbi decoder within RX data processor 170 is typically able to correct some or many of the bit errors. Selector 452 receives the training bits $x_{ts}$ and the re-encoded bits $x_{enc}$, provides the training bits as the reference bits $x_{ref}$ for the first outer iteration, and provides the training bits and the re-encoded bits as the reference bits for each subsequent outer iteration.

Figure 12:
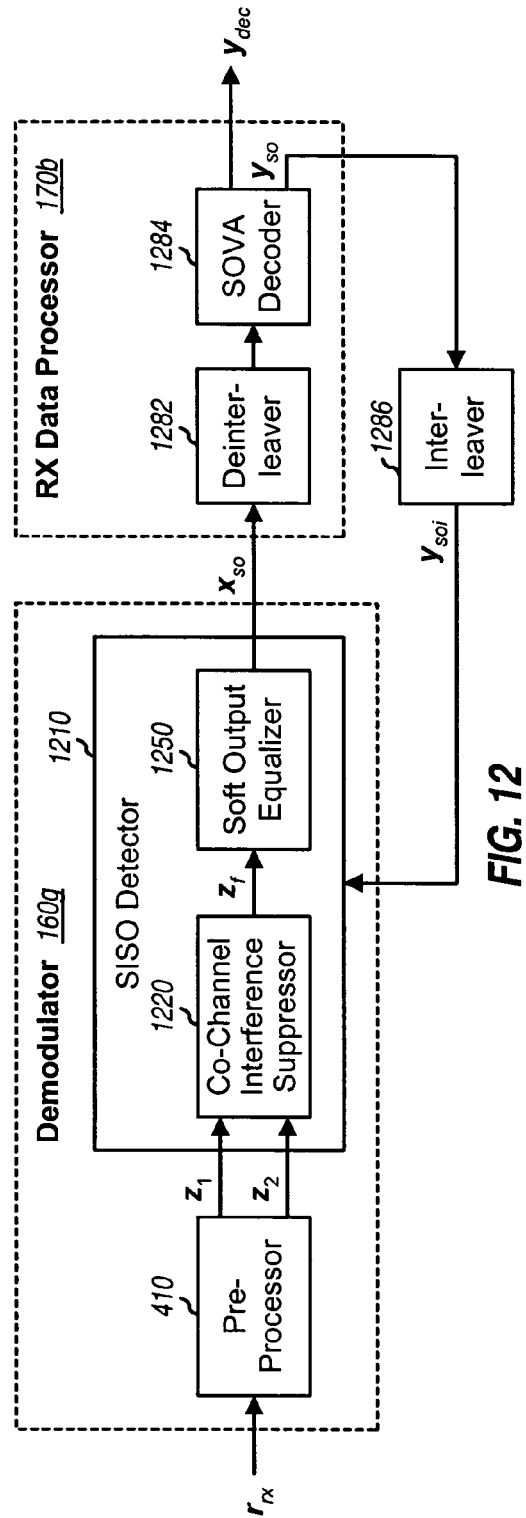
FIG. 12 shows a demodulator and an RX data processor that perform iterative interference suppression and decoding.

FIG. 12 shows an embodiment of a demodulator 160*g* and an RX data processor 170*b* that perform iterative interference suppression and decoding. Within demodulator 160*g*, a co-channel interference suppressor 1220 receives the two complex-valued input sample sequences $z_1$ and $z_2$ from pre-processor 410 and possibly soft outputs $y_{soi}$ from an interleaver 1286. Interference suppressor 1220 may be implemented with interference suppressor 420*a* in FIG. 8, interference suppressor 420*b* in FIG. 9, or some other design. Interference suppressor 1220 suppresses co-channel interference and provides CCI-suppressed samples. A soft-output equalizer 1250 performs equalization on the CCI-suppressed samples and possibly the soft outputs $y_{soi}$ and provides soft detected symbols $x_{so}$. Interference suppressor 1220 and equalizer 1250 may use the soft outputs $y_{soi}$ in various manners. For example, the soft outputs $y_{soi}$ may be used for channel estimation. As another example, equalizer 1250 may implement a soft-input soft-output equalizer that utilizes the information in the soft outputs $y_{soi}$ to improve detection performance.

Within RX data processor 170*b*, a deinterleaver 1282 deinterleaves the soft detected symbols $x_{so}$ in a manner complementary to the interleaving performed by the desired transmitter 110. A soft output Viterbi algorithm (SOVA) decoder 1284 performs decoding on the deinterleaved symbols from deinterleaver 1282, provides soft outputs $y_{so}$ for each outer iteration except for the last outer iteration, and provides decoded bits $y_{dec}$ for the last outer iteration. Interleaver 1286 interleaves the soft outputs $y_{so}$ from SOVA decoder 1284 in the same manner performed by TX data processor 120 at transmitter 110 and provides the interleaved soft outputs $y_{soi}$.

For the embodiment shown in FIG. 12, interference suppressor 1220 and soft output equalizer 1250 form a soft-input soft-output (SISO) detector 1210. SISO detector 1210 receives soft inputs from pre-processor 410 and soft inputs from SOVA decoder 1284 via interleaver 1286, suppresses co-channel interference and intersymbol interference, and provides soft outputs. This embodiment performs iterative interference suppression (via SISO detector 1210) and decoding (via SOVA decoder 1284) to achieve improved performance. This structure also resembles a Turbo decoder with two SISO decoders coupled in a feedback configuration.

For clarity, specific embodiments of a receiver with a single actual antenna have been described above for GSM. In general, the receiver may be equipped with any number of actual antennas that may be used to form any number of virtual antennas. The receiver may also be used for various communication systems such as a Time Division Multiple Access (TDMA) system, a Code Division Multiple Access (CDMA) system, a Frequency Division Multiple Access (FDMA) system, an Orthogonal Frequency Division Multiple Access (OFDMA) system, and so on. A TDMA system may implement one or more TDMA radio access technologies (RATs) such as GSM. A CDMA system may implement one or more CDMA RATs such as Wideband-CDMA (W-CDMA), cdma2000, and TS-CDMA. These various RATs are well known in the art. W-CDMA and GSM are parts of Universal Mobile Telecommunication System (UMTS) and are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. The innovative receiver provides improved performance over conventional receivers and allows a network to improve capacity by using the same frequency band/channel at shorter distances.

The receiver described herein may be implemented by various means. For example, the receiver may be implemented in hardware, software, or a combination thereof. For a hardware implementation, the processing units used to perform co-channel interference suppression, equalization, and data processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the processing may be implemented with modules (e.g., procedures, functions, and so on) that perform the functions described herein. The software codes may be stored in a memory unit (e.g., memory unit 182 in FIG. 1) and executed by a processor (e.g., controller 180). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A receiver comprising:
   a pre-processor operative to process samples from a signal received at an antenna to generate a plurality of sequences of input samples from the signal, wherein the input samples are generated by oversampling the signal received at the antenna and a different one of the input samples generated by the oversampling from each sample period is included in each of the plurality of sequences of input samples, and wherein the sequences of input samples are offset from one another by a fraction of the sample period;
   an interference suppressor operative to suppress co-channel interference (CCI) in the plurality of sequences of input samples and to provide at least one sequence of CCI-suppressed samples; and
   an equalizer operative to perform detection on the at least one sequence of CCI-suppressed samples.

2. The receiver of claim 1, wherein the pre-processor is operative to provide at least one sequence of early samples and at least one sequence of late samples for the antenna, the early and late samples being offset by a half sample period.

3. The receiver of claim 1, wherein the pre-processor is operative to provide at least one sequence of inphase samples and at least one sequence of quadrature samples for the antenna, the inphase and quadrature samples corresponding to real and imaginary parts, respectively, of complex-valued samples.

4. The receiver of claim 1, wherein the pre-processor comprises:
   a filter operative to filter the received samples to generate a plurality of sequences of intermediate samples; and
   a rotator operative to perform phase rotation on the plurality of sequences of intermediate samples to generate the plurality of sequences of input samples.

5. The receiver of claim 1, wherein the interference suppressor comprises a multiple-input multiple-output (MIMO) filter operative to filter the plurality of sequences of input samples with a plurality of weights to generate the at least one sequence of CCI-suppressed samples, the plurality of weights being derived to suppress the co-channel interference in the plurality of sequences of input samples.

6. The receiver of claim 5, wherein the MIMO filter comprises a plurality of finite impulse response (FIR) filters operative to filter the plurality of sequences of input samples.

7. The receiver of claim 6, wherein each of the plurality of FIR filters is operative to filter a respective sequence of input samples with a respective set of weights.

8. The receiver of claim 1, wherein the interference suppressor comprises:
   a channel estimator operative to derive at least one channel estimate based on the plurality of sequences of input samples;
   a signal estimator operative to derive at least one desired signal estimate based on the at least one channel estimate;
   a computation unit operative to compute weights used to suppress co-channel interference; and
   a multiple-input multiple-output (MIMO) filter operative to filter the plurality of sequences of input samples with the weights to generate the at least one sequence of CCI-suppressed samples.

9. The receiver of claim 8, wherein the channel estimator is operative to derive the at least one channel estimate using a least-squares (LS) criterion.

10. The receiver of claim 8, wherein the computation unit is operative to compute the weights for the MIMO filter using a minimum mean square error (MMSE) criterion.

11. The receiver of claim 8, wherein the channel estimator, the signal estimator, the computation unit, and the MIMO filter are operated for a plurality of iterations.

12. The receiver of claim 1, wherein the equalizer comprises:
    a channel estimator operative to derive at least one channel estimate based on the at least one sequence of CCI-suppressed samples; and
    a detector operative to perform detection on the at least one sequence of CCI-suppressed samples with the at least one channel estimate.

13. The receiver of claim 12, wherein the detector is a maximum likelihood sequence estimator (MLSE).

14. The receiver of claim 1, wherein the interference suppressor is operative to provide at least two sequences of CCI-suppressed samples, and wherein the equalizer comprises:
    a channel estimator operative to derive at least two channel estimates based on the at least two sequences of CCI-suppressed samples;
    a signal estimator operative to derive at least two desired signal estimates based on the at least two channel estimates;
    a computation unit operative to compute a noise correlation matrix based on the at least two desired signal estimates and the at least two sequences of CCI-suppressed samples; and
    a detector operative to perform detection on the at least two sequences of CCI-suppressed samples with the at least two channel estimates and the noise correlation matrix.

15. The receiver of claim 14, wherein the detector is a maximum likelihood sequence estimator (MLSE) and is operative to compute branch metrics using the noise correlation matrix.

16. The receiver of claim 1, further comprising:
    a selector operative to receive detected bits from the equalizer and a training sequence and to provide reference bits for the interference suppressor and the equalizer.

17. The receiver of claim 1, wherein the interference suppressor and the equalizer are operated for a plurality of iterations.

18. The receiver of claim 17, wherein the interference suppressor is operative to suppress the co-channel interference based on a training sequence for a first iteration and based on detected bits from the equalizer and the training sequence for each subsequent iteration.

19. The receiver of claim 17, wherein the equalizer is operative to perform detection based on a training sequence for a first iteration and based on detected bits from the equalizer and the training sequence for each subsequent iteration.

20. The receiver of claim 1, further comprising:
a filter operative to filter soft decisions generated based on an output of the equalizer and to provide filtered symbols;
a threshold compare unit operative to compare the filtered symbols against a threshold and to provide comparison results; and
a selector operative to provide reference bits for the interference suppressor and the equalizer based on the comparison results.

21. The receiver of claim 20, wherein the filter is operative to filter the soft decisions with a plurality of weights derived based on a channel impulse response estimate.

22. The receiver of claim 1, further comprising:
a receive data processor operative to process an output of the equalizer to obtain decoded data; and
a transmit data processor operative to process the decoded data to generate re-encoded bits, wherein the equalizer is operative to perform detection based on the re-encoded bits.

23. The receiver of claim 22, wherein the interference suppressor is operative to suppress co-channel interference based on the encoded bits.

24. The receiver of claim 1, further comprising:
a receive data processor operative to process an output of the equalizer to generate soft output symbols for a soft-input soft-output (SISO) detector formed by the interference suppressor and the equalizer, wherein the SISO detector and the receive data processor are operated for a plurality of iterations.

25. A receiver comprising:
a pre-processor operative to process samples from a signal received at an antenna to generate a plurality of sequences of input samples from the signal, wherein the input samples are generated by oversampling the signal received at the antenna, a different one of the input samples generated by the oversampling from each sample period is included in each of the plurality of sequences of input samples, and by decomposing complex-valued samples into inphase and quadrature samples, and wherein the sequences of input samples are offset from one another by a fraction of the sample period;
an interference suppressor operative to suppress co-channel interference (CCI) in the plurality of sequences of input samples and to provide at least one sequence of CCI-suppressed samples; and
an equalizer operative to perform detection on the at least one sequence of CCI-suppressed samples.

26. A method of receiving data in a communication system, comprising:
processing samples from a signal received at an antenna to generate a plurality of sequences of input samples from the signal, wherein the input samples are generated by oversampling the signal received at the antenna and a different one of the input samples generated by the oversampling from each sample period is included in each of the plurality of sequences of input samples, and wherein the sequences of input samples are offset from one another by a fraction of the sample period;
suppressing co-channel interference (CCI) in the plurality of sequences of input samples to generate at least one sequence of CCI-suppressed samples; and
performing detection on the at least one sequence of CCI-suppressed samples.

27. The method of claim 26, wherein the processing the samples for the antenna comprises:
filtering the received samples to obtain a plurality of sequences of intermediate samples; and
performing phase rotation on the plurality of sequences of intermediate samples to generate the plurality of sequences of input samples.

28. The method of claim 26, wherein the suppressing co-channel interference in the plurality of sequences of input samples comprises:
computing a plurality of weights used to suppress co-channel interference; and
filtering the plurality of sequences of input samples with the plurality of weights to generate the at least one sequence of CCI-suppressed samples.

29. The method of claim 26, wherein the suppressing co-channel interference in the plurality of sequences of input samples comprises:
deriving at least one channel estimate based on the plurality of sequences of input samples;
deriving at least one desired signal estimate based on the at least one channel estimate;
computing weights used to suppress co-channel interference; and
filtering the plurality of sequences of input samples with the weights to generate the at least one sequence of CCI-suppressed samples.

30. The method of claim 26, wherein the performing detection on the at least one sequence of CCI-suppressed samples comprises:
deriving a channel estimate based on the at least one sequence of CCI-suppressed samples; and
performing detection on the at least one sequence of CCI-suppressed samples with the channel estimate.

31. The method of claim 26, wherein at least two sequences of CCI-suppressed samples are generated, and wherein the performing detection on the at least two sequences of CCI-suppressed samples comprises:
deriving at least two channel estimates based on the at least two sequences of CCI-suppressed samples;
deriving at least two desired signal estimates based on the at least two channel estimates;
computing a noise correlation matrix based on the at least two desired signal estimates and the at least two sequences of CCI-suppressed samples; and
performing detection on the at least two sequences of CCI-suppressed samples with the at least two channel estimates and the noise correlation matrix.

32. The method of claim 26, further comprising:
performing co-channel interference suppression and detection for a plurality of iterations.

33. The method of claim 26, further comprising:
determining quality of detected bits generated by the detection;
generating reference bits based on the determined quality of the detected bits; and
using the reference bits for co-channel interference suppression, detection, or both co-channel interference suppression and detection.

34. The method of claim 26, further comprising:
decoding detected bits generated by the detection to obtain decoded data;

encoding the decoded data to obtain re-encoded bits; and using the re-encoded bits for co-channel interference suppression, detection, or both co-channel interference suppression and detection.

35. The method of claim 26, further comprising:

decoding an output generated by the detection to obtain soft output symbols; and using the soft output symbols for co-channel interference suppression, detection, or both co-channel interference suppression and detection.

36. An apparatus in a communication system, comprising:

means for processing samples from a signal received at an antenna to generate a plurality of sequences of input samples from the signal, wherein the input samples are generated by oversampling the signal received at the antenna and a different one of the input samples generated by the oversampling from each sample period is included in each of the plurality of sequences of input samples, and wherein the sequences of input samples are offset from one another by a fraction of the sample period;

means for suppressing co-channel interference (CCI) in the plurality of sequences of input samples to generate at least one sequence of CCI-suppressed samples; and means for performing detection on the at least one sequence of CCI-suppressed samples.

37. The apparatus of claim 26, wherein the means for processing the received samples for the at least one antenna comprises:

means for filtering the received samples to obtain a plurality of sequences of intermediate samples; and means for performing phase rotation on the plurality of sequences of intermediate samples to generate the plurality of sequences of input samples.

38. The apparatus of claim 36, wherein the means for suppressing co-channel interference in the plurality of sequences of input samples comprises:

means for computing a plurality of weights used to suppress co-channel interference; and means for filtering the plurality of sequences of input samples with the plurality of weights to generate the at least one sequence of CCI-suppressed samples.

39. The apparatus of claim 36, wherein the means for suppressing co-channel interference in the plurality of sequences of input samples comprises:

means for deriving at least one channel estimate based on the plurality of sequences of input samples;

means for deriving at least one desired signal estimate based on the at least one channel estimate;

means for computing weights used to suppress co-channel interference; and means for filtering the plurality of sequences of input samples with the weights to generate the at least one sequence of CCI-suppressed samples.

40. The apparatus of claim 36, wherein the means for performing detection on the at least one sequence of CCI-suppressed samples comprises:

means for deriving a channel estimate based on the at least one sequence of CCI-suppressed samples; and means for performing detection on the at least one sequence of CCI-suppressed samples with the channel estimate.

41. The apparatus of claim 36, wherein at least two sequences of CCI-suppressed samples are generated, and wherein the means for performing detection on the at least two sequences of CCI-suppressed samples comprises:

means for deriving at least two channel estimates based on the at least two sequences of CCI-suppressed samples;

means for deriving at least two desired signal estimates based on the at least two channel estimates;

means for computing a noise correlation matrix based on the at least two desired signal estimates and the at least two sequences of CCI-suppressed samples; and means for performing detection on the at least two sequences of CCI-suppressed samples with the at least two channel estimates and the noise correlation matrix.

42. The apparatus of claim 36, further comprising:

means for performing co-channel interference suppression and detection for a plurality of iterations.

43. The apparatus of claim 36, further comprising:

means for determining quality of detected bits generated by the detection;

means for generating reference bits based on the determined quality of the detected bits; and means for using the reference bits for co-channel interference suppression, detection, or both co-channel interference suppression and detection.

44. The apparatus of claim 36, further comprising:

means for decoding detected bits generated by the detection to obtain decoded data;

means for encoding the decoded data to obtain re-encoded bits; and means for using the re-encoded bits for co-channel interference suppression, detection, or both co-channel interference suppression and detection.

45. The apparatus of claim 36, further comprising:

means for decoding an output generated by the detection to obtain soft output symbols; and means for using the soft output symbols for co-channel interference suppression, detection, or both co-channel interference suppression and detection.

46. A computer-program product comprising memory having instructions stored thereon, the instructions comprising:

code for processing samples from a signal received at an antenna to generate a plurality of sequences of input samples from the signal, wherein the input samples are generated by oversampling the signal received at the antenna and a different one of the input samples generated by the oversampling from each sample period is included in each of the plurality of sequences of input samples, and wherein the sequences of input samples are offset from one another by a fraction of the sample period;

code for suppressing co-channel interference (CCI) in the plurality of sequences of input samples to generate at least one sequence of CCI-suppressed samples; and code for performing detection on the at least one sequence of CCI-suppressed samples.

* * * * *

UNITED STATES PATENT AND TRADEMARK OFFICE
CERTIFICATE OF CORRECTION

| | | |
|---|---|---|
| PATENT NO. | : 7,801,248 B2 | Page 1 of 1 |
| APPLICATION NO. | : 11/122654 | |
| DATED | : September 21, 2010 | |
| INVENTOR(S) | : Challa et al. | |

It is certified that error appears in the above-identified patent and that said Letters Patent is hereby corrected as shown below:

Column 23, line 27, claim 37: "claim 26" to read as --claim 36--

Signed and Sealed this
Nineteenth Day of July, 2011

David J. Kappos
*Director of the United States Patent and Trademark Office*